US012749021B2

(12) United States Patent
Wilson et al.

(10) Patent No.: US 12,749,021 B2
(45) Date of Patent: Sep. 29, 2026

(54) AUTOMATED PROCESSING OF MULTIPLE PREDICTION GENERATION INCLUDING MODEL TUNING

(71) Applicant: Databricks, Inc., San Francisco, CA (US)

(72) Inventors: Benjamin Thomas Wilson, Apex, NC (US); Corey Zumar, Santa Clara, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 18/738,025

(22) Filed: Jun. 9, 2024

(65) Prior Publication Data

US 2025/0061378 A1 Feb. 20, 2025

Related U.S. Application Data

(63) Continuation of application No. 17/896,281, filed on Aug. 26, 2022, now Pat. No. 12,033,041, which is a continuation of application No. 17/587,806, filed on Jan. 28, 2022, now Pat. No. 11,468,369.

(51) Int. Cl.

| | |
|---|---|
| ***G06N 20/00*** | (2019.01) |
| ***G06F 18/20*** | (2023.01) |
| ***G06F 18/2132*** | (2023.01) |

(52) U.S. Cl.

CPC ....... *G06N 20/00* (2019.01); *G06F 18/21322* (2023.01); *G06F 18/285* (2023.01); *G06F 18/21326* (2023.01)

(58) Field of Classification Search

CPC ........ G06N 20/00; G06N 5/01; G06K 9/6227; G06K 9/6235; G06K 2009/6237; G06F 18/21322; G06F 18/285; G06F 18/21326; G06F 18/2413

See application file for complete search history.

(56) References Cited

U.S. PATENT DOCUMENTS

| | | | |
|---|---|---|---|
| 9,569,745 B1 | 2/2017 | Ananthanarayanan et al. | |
| 11,443,237 B1 | 9/2022 | Song et al. | |
| 2016/0132787 A1* | 5/2016 | Drevo .................... | G06N 20/10 706/12 |

(Continued)

FOREIGN PATENT DOCUMENTS

WO WO 2016/004075 A1 1/2016

OTHER PUBLICATIONS

United States Office Action, U.S. Appl. No. 17/587,820, Jul. 10, 2024, 34 pages.

(Continued)

*Primary Examiner* — Dave Misir

(74) *Attorney, Agent, or Firm* — Fenwick & West LLP

(57) ABSTRACT

The present application discloses a method, system, and computer system for building a model associated with a dataset. The method includes receiving a data set, the dataset comprising a plurality of keys and a plurality of key-value relationships, determining a plurality of models to build based at least in part on the dataset, wherein determining the plurality of models to build comprises using the dataset format information to identify the plurality of models, building the plurality of models, and optimizing at least one of the plurality of models.

20 Claims, 14 Drawing Sheets

(56) References Cited

U.S. PATENT DOCUMENTS

| | | | | |
|---|---|---|---|---|
| 2016/0162779 | A1* | 6/2016 | Marcus | G06N 20/10 706/12 |
| 2016/0292199 | A1 | 10/2016 | Cronin et al. | |
| 2017/0017900 | A1 | 1/2017 | Maor et al. | |
| 2019/0042887 | A1 | 2/2019 | Nguyen et al. | |
| 2020/0012584 | A1 | 1/2020 | Walters et al. | |
| 2020/0110619 | A1* | 4/2020 | Rajaram | G06N 20/00 |
| 2020/0134489 | A1 | 4/2020 | Achin et al. | |
| 2020/0160229 | A1 | 5/2020 | Atcheson | |
| 2020/0349468 | A1 | 11/2020 | Arya et al. | |
| 2020/0394257 | A1 | 12/2020 | Santoso et al. | |
| 2020/0401930 | A1* | 12/2020 | Smirnov | G06N 20/00 |
| 2020/0410356 | A1 | 12/2020 | Kuo et al. | |
| 2021/0232920 | A1* | 7/2021 | Parangi | G06F 16/2457 |
| 2021/0256310 | A1* | 8/2021 | Roberts | G06F 18/2148 |
| 2021/0287048 | A1* | 9/2021 | Walters | G06N 3/084 |
| 2021/0326782 | A1* | 10/2021 | Achin | G06F 9/5011 |
| 2021/0374610 | A1 | 12/2021 | Dirac et al. | |
| 2021/0390455 | A1* | 12/2021 | Schierz | G06N 20/00 |
| 2022/0024032 | A1* | 1/2022 | Singh | B25J 9/1653 |
| 2022/0050695 | A1 | 2/2022 | Gajendran et al. | |
| 2022/0051129 | A1* | 2/2022 | Malvankar | G06F 9/4881 |
| 2022/0075782 | A1 | 3/2022 | Hines et al. | |
| 2022/0076164 | A1 | 3/2022 | Conort et al. | |
| 2022/0092471 | A1* | 3/2022 | Jaeger | G06N 20/20 |
| 2022/0156642 | A1 | 5/2022 | Schmidt et al. | |
| 2022/0179910 | A1 | 6/2022 | Bharathy et al. | |
| 2022/0180146 | A1 | 6/2022 | Saxena et al. | |
| 2022/0245448 | A1* | 8/2022 | Ni | G06N 20/00 |
| 2023/0123157 | A1* | 4/2023 | Ramanan | H04L 63/1425 706/12 |
| 2023/0139783 | A1 | 5/2023 | Garib et al. | |

OTHER PUBLICATIONS

PCT International Search Report and Written Opinion, PCT Application No. PCT/US2022/014580, May 12, 2022, 9 pages.

United States Office Action, U.S. Appl. No. 17/587,820, Jan. 26, 2024, 44 pages.

United States Office Action, U.S. Appl. No. 17/587,806, Apr. 4, 2022, 16 pages.

Chambers, et al. Spark, the definitive guide: big data processing made simple, Feb. 8, 2018, 400 pages.

European Patent Office, Extended European Search Report, EP Patent Application No. 22924475.1, dated Nov. 4, 2025, 10 pages.

United States Office Action, U.S. Appl. No. 17/587,793, dated Jan. 20, 2026, 26 pages.

United States Office Action, U.S. Appl. No. 17/587,806, dated Apr. 4, 2022, 16 pages.

United States Office Action, U.S. Appl. No. 17/896,281, Nov. 21, 2023, 17 pages.

The Databricks Blog Fine-Grained Time Series Forecasting with Facebook Prophet Updated for Apache Spark, Apr. 6, 2021, 9 pages.

United States Office Action, U.S. Appl. No. 17/587,820, Mar. 14, 2025, 37 pages.

Non-Final Rejection Mailed on Apr. 15, 2025 for U.S. Appl. No. 17/587,793, 25 page(s).

* cited by examiner

| Country | Airport | Date | Passengers |
|---|---|---|---|
| US | JFK | 1/1/20 | 83562 |
| US | JFK | 1/2/20 | 72553 |
| US | JFK | 1/3/20 | 61358 |
| US | JFK | 1/4/20 | 115961 |
| US | LGA | 1/1/20 | 43228 |
| US | LGA | 1/2/20 | 61813 |
| US | LGA | 1/3/20 | 154977 |
| US | LGA | 1/4/20 | 113699 |

500

FIG. 5A

User input dataset

| key1 | key2 | datetime | value |
|---|---|---|---|
| US | CA | 7/1/20 | 13.1 |
| US | CA | 7/2/20 | 8.6 |
| US | CA | 7/3/20 | 11.7 |
| US | WA | 7/1/20 | 9.3 |
| US | WA | 7/2/20 | 7.2 |
| US | WA | 7/3/20 | 6.8 |
| CA | ON | 7/1/20 | 37.5 |
| CA | ON | 7/2/20 | 19.8 |
| CA | ON | 7/3/20 | 14.5 |

If user-supplied grouping is done at the "key1" level (omitting "key2"), then the 'value' column will be summed with a grouping performed on the keyed collection of (key1, datetime).

Transformation internal API

{

("US", "CA"):

| group_key | datetime | value |
|---|---|---|
| (US, CA) | 7/1/20 | 13.1 |
| (US, CA) | 7/2/20 | 8.6 |
| (US, CA) | 7/3/20 | 11.7 |

("US", "WA"):

| group_key | datetime | value |
|---|---|---|
| (US, WA) | 7/1/20 | 9.3 |
| (US, WA) | 7/2/20 | 7.2 |
| (US, WA) | 7/3/20 | 6.8 |

("CA", "ON"):

| group_key | datetime | value |
|---|---|---|
| (CA, ON) | 7/1/20 | 37.5 |
| (CA, ON) | 7/2/20 | 19.8 |
| (CA, ON) | 7/3/20 | 14.5 |

{

525

FIG. 5B

```
Grouped time series DF:
                       ds        y  key
0      2011-01-25 00:07:00  41.1227  a0
1      2011-01-26 00:07:00  41.0653  a0
2      2011-01-27 00:07:00  45.6838  a0
3      2011-01-28 00:07:00  54.0344  a0
4      2011-01-29 00:07:00  46.5143  a0
...                    ...      ...  ..
145995 2015-01-19 00:07:00  25.7892  v3
145996 2015-01-20 00:07:00  30.414   v3
145997 2015-01-21 00:07:00  30.3512  v3
145998 2015-01-22 00:07:00  35.2441  v3
145999 2015-01-23 00:07:00  33.6389  v3

[146000 rows x 3 columns]
```

600

FIG. 6A

Fit model metrics for all groups:

| | mse | rmse | mae | mape | mdape | smape | coverage |
|---|---|---|---|---|---|---|---|
| a0 | 381.078887 | 19.410472 | 16.887662 | 0.381869 | 0.316224 | 0.337854 | 0.421409 |
| a1 | 0.290632 | 0.536011 | 0.466399 | 0.381933 | 0.316441 | 0.338027 | 0.412150 |
| a2 | 321.247689 | 17.821764 | 15.504357 | 0.381919 | 0.316170 | 0.337820 | 0.422087 |
| a3 | 848.870105 | 28.969945 | 25.202952 | 0.381930 | 0.316013 | 0.337713 | 0.413279 |
| b0 | 120.434350 | 10.910943 | 9.493177 | 0.381935 | 0.316195 | 0.337822 | 0.415989 |
| .. | ... | ... | ... | ... | ... | ... | ... |
| y1 | 1394.636121 | 37.132621 | 32.310351 | 0.381919 | 0.316414 | 0.338095 | 0.424571 |
| y2 | 1517.749042 | 38.738528 | 33.703224 | 0.381935 | 0.316326 | 0.337996 | 0.408311 |
| z0 | 2104.542145 | 45.616671 | 39.686210 | 0.381896 | 0.316285 | 0.337955 | 0.400858 |
| z1 | 2516.666704 | 49.875976 | 43.398035 | 0.381954 | 0.316404 | 0.337978 | 0.405149 |
| z2 | 2360.743292 | 48.308744 | 42.034515 | 0.381917 | 0.316316 | 0.337980 | 0.413279 |

650

FIG. 6B

AUTOMATED PROCESSING OF MULTIPLE PREDICTION GENERATION INCLUDING MODEL TUNING

CROSS REFERENCE TO OTHER APPLICATIONS

This application is a continuation of U.S. patent application Ser. No. 17/896,281, filed on Aug. 26, 2022, which is a continuation of U.S. patent application Ser. No. 17/587,806, filed Jan. 28, 2022, both of which are incorporated herein by reference for all purposes.

BACKGROUND OF THE INVENTION

A system for big data processing comprises a system for deployments of applications, configurations, one or more datasets, and model(s) used in connection with analyzing the data. Models are generally deployed in services and applications, such as web-based services, in connection with providing estimated outcomes, etc. A model is generated or trained based on relationships among different input data. At scale, numerous models are used to provide predictions with different aspects of a same dataset, and each model uses numerous relationships among data, and the development of such relationships is very resource intensive. This creates a problem for training the numerous models corresponding to a dataset in an efficient manner and tuning the models to ensure that the models continue to provide effective predictions.

BRIEF DESCRIPTION OF THE DRAWINGS

Various embodiments of the invention are disclosed in the following detailed description and the accompanying drawings.

FIG. 5A is a diagram of a dataset used in connection with deploying a model according to various embodiments of the present application.

FIG. 5B is a diagram of a dataset used in connection with a model according to various embodiments of the present application.

FIG. 6A is a diagram of a dataset used in connection with a model according to various embodiments of the present application.

FIG. 6B is a diagram of one or more characteristics associated with a set of models according to various embodiments of the present application.

DETAILED DESCRIPTION

Figure 1:
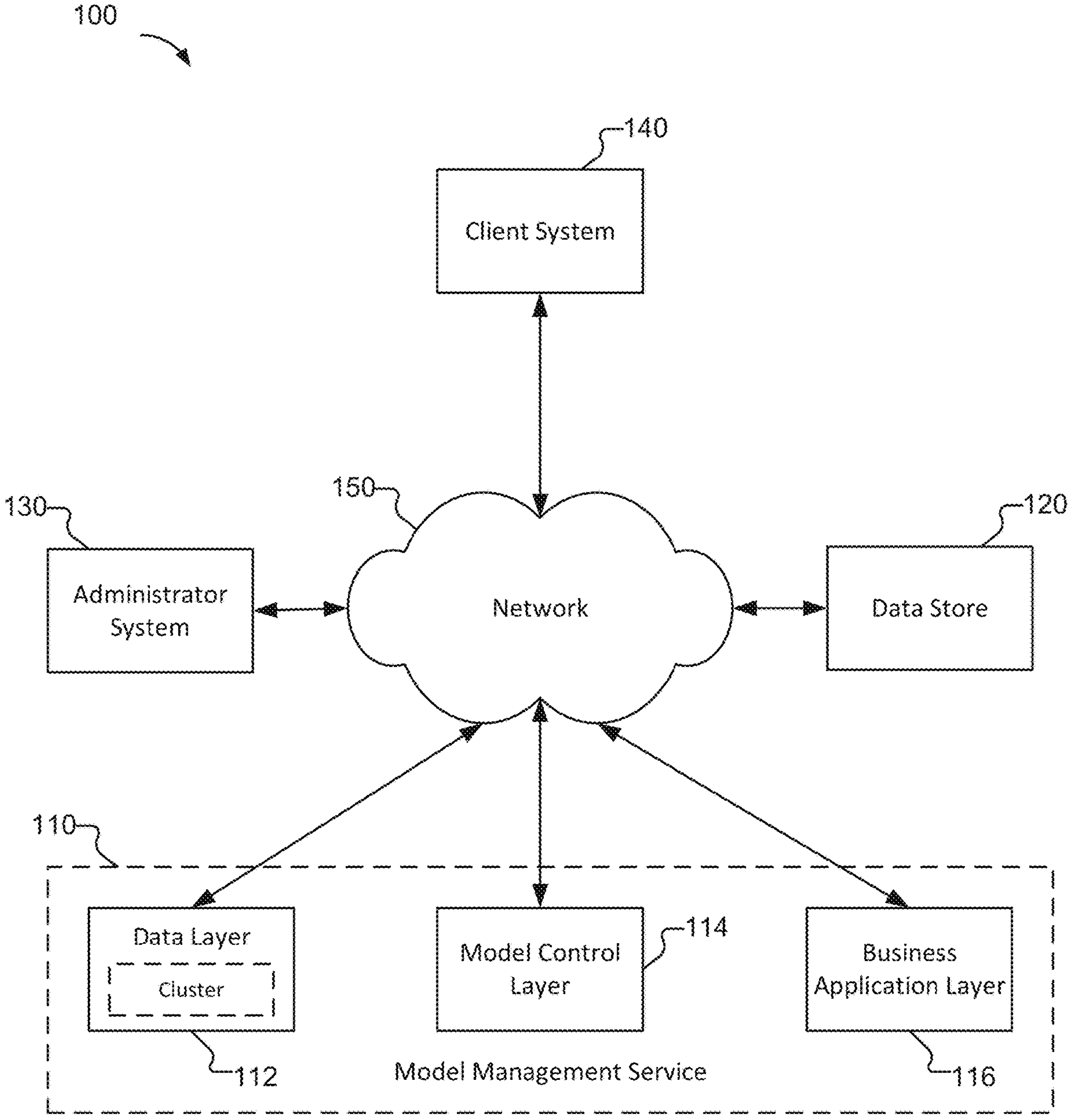
FIG. 1 is a block diagram of a system for building and tuning a model according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a model means a machine learning model. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc.

According to various embodiments, a system, method, and/or device for managing a dataset used in connection with one or more models. The system comprises one or more processors and a memory. The one or more processors are configured to (i) provide an input interface via which a first entity inputs a dataset, (ii) receive the dataset, and (iii) provide a selection interface that exposes to a second entity the plurality of models determined for the dataset and/or the plurality of results corresponding to the plurality of models using index entries. The dataset may comprise a plurality of keys and a plurality of key-value relationships. The dataset may be formatted according to a predefined format and include index entries that are generated for a plurality of models and a plurality of results corresponding to the plurality of models.

According to various embodiments, a system, method, and/or device for generating one or more models. The system comprises one or more processors and a memory. The one or more processors are configured to (i) receive a dataset, the dataset comprising a plurality of keys and a plurality of key-value relationships, (ii) determine a plurality of models to build based at least in part on the dataset, (iii) build the plurality of models, and (iv) optimize at least one of the plurality of models. The determining the plurality of models to build may comprise using the dataset format information to identify the plurality of models.

According to various embodiments, a system, method, and/or device for automatically tuning one or more models. The system comprises one or more processors and a memory. The one or more processors are configured to (i) determine a set of one or more models to optimize, (ii) determine a plurality of optimizer modules with which to optimize the set of one or more models, (iii) cause the plurality of optimizer modules to respectively perform a respective optimizing process with respect to at least one model of the set of one or more models, and (iv) deploy an optimized model obtained based at least in part on optimizing metrics of the set of the one or more models. For example, the optimized model is selected by training models using various parameter sets and determining a metric for the fitting of the output of the model to a desired output, and the goodness of the fitting is used to select the parameter set that creates the optimized model.

In some embodiments, the system provides an interface via which a dataset is provided to the system in connection with the system building and/or maintaining a set of models (e.g., one or more models) with respect to the dataset (e.g., a model that provides a prediction with respect to at least one dimension of the dataset). The system may determine the set of models to build based at least in part on a format or syntax of the dataset. For example, the dataset comprises a plurality of keys and corresponding values. The plurality of keys may correspond to a plurality of columns of the dataset (e.g., a user indicated selected set of columns). In some embodiments, a particular key corresponds to a grouping of columns of the dataset. In some embodiments, in response to receiving the dataset, the system analyzes the dataset and extracts at least a subset of the plurality of keys. In response to determining the plurality of keys, the system determines the set of models to be built with respect to the dataset. For example, the plurality of keys are indicative of the set of models to be built with respect to the dataset. Accordingly, as an example, a user may instruct the system of the desired set of models to be built (or the predictions which the system is to generate with respect to the dataset). The user may upload the dataset via the interface, and in response to receiving the dataset, the system may automatically build (e.g., train) the set of models.

According to various embodiments, the dataset is uploaded as a single data entity. The dataset comprises a multi-keyed, key-value relationship. For example, the dataset comprises a plurality of columns, and at least a subset of the columns corresponds to a key, and values comprised in such a column comprise a key-value corresponding to the column key. As an example, if the dataset represents sales for a chain of stores, the dataset may comprise fields (e.g., columns) corresponding to one or more of country, state, region, item, price, date-time information, etc. The dataset may include various other fields. Each field (or a subset of fields) may correspond to keys for the dataset. According to various embodiments, the dataset is formatted based at least in part on a set of models that are to be determined (e.g., built) for the dataset. For example, a user (e.g., a user for a customer organization) may determine the models to be built (or predictions that the user desires to obtain using the dataset) and formats the dataset accordingly before uploading to the system. In some embodiments, the format of the dataset defines a granularity of models to be built using the dataset.

According to various embodiments, the system receives the dataset from the user (e.g., the customer) via an interface. In response to receiving the dataset, the system analyzes the dataset and uses the analysis to determine a set of one or more models to build based at least in part on the dataset (e.g., a set of models necessary to make predictions with respect to information pertaining to the dataset such as values for a particular key). In response to determining the set of one or more models to build, the system builds the models, optimizes the models, and provides (or exposes) the set of one or more models via an interface. For example, the set of one or more models may be exposed to a user via an application programming interface (API) and/or a web interface, etc. As another example, the set of one or more models may be comprised in (or referenced/subject to a pointer by) a composite model. The system may receive a query (e.g., from a user or another system such as a user system, etc.) with respect to set of one or more models, invoke a particular model(s) in connection with the one or more models, and provide a response to the query.

In some embodiments, a format of the dataset defines an atomic unit or dimension of the dataset. As an example, an atomic unit may correspond to a key of the dataset, a column of the dataset, etc. In some embodiments, a particular key corresponds to a grouping of columns of the dataset. The atomic unit or dimension of the dataset may be defined as being based at least in part on the desired model(s) to be built using the dataset. The system analyzes the dataset and correspondingly determines the format of the dataset and the keys for the dataset. In some embodiments, the analyzing the dataset includes extracting the keys associated with a dataset. As an example, the system uses the keys in connection with determining the set of one or more models to be built for the dataset. In some embodiments, the system determines a set of combinations or permutations of keys for the dataset and determines the set of one or more models to build based at least in part on the set of combinations or permutations of keys for the dataset. For example, the system determines a set of all unique combination of keys for the dataset and determines the set of one or more models based at least in part on the set of all unique combination of keys for the dataset (e.g., a model is built for each unique combination comprised in the set of all unique combination of keys, etc.). Each unique combination of keys for a dataset may correspond to a unique dimension along which the dataset is analyzed and for which a model is built. In the case of a dataset corresponding to sales for a chain of stores, examples of a unit of data (or dimension) along or for which a model is determined to be built includes a model for store-by-store sales, a model for item-by-item sales for a particular store, a model for sales for a department (or department-by-department) sales for a particular store, a model for sales of a type of item for a particular store, a model for sales of a type of item across all stores, etc. Related art systems first instantiate a model, and then provide the model data to train the model. For a related art system, a massive dataset is received, and then a user for the related art system is required to figure out atomic units that define the dataset (e.g., the datasets according to the related art are not keyed for atomic units that may form a basis for determining the set of models to build, etc.). Thereafter, the related art systems train the model and obtain the results. In various embodiments, a dataset is received, and a set of models is determined to build based at least in part on the dataset, thus the system enables asynchronous processing to build the models.

According to various embodiments, in response to determining the set of one or more models to build based at least in part on the dataset (e.g., in response to determining dimensions of the dataset along which models are to be built), the system builds the one or more models. In some embodiments, the system builds the one or more models based on a batch process. For example, at least a subset of the one or more models may be determined in parallel with each other. The system may determine a set of compute resources (e.g., threads, compute nodes, processor cores, etc.) to allocate to the building of the one or more models (or subsets thereof). A compute resource may also be referred to herein as an optimizer or optimizer module. As an example, the system determines a set of compute resources available for building models. In response to determining the set of compute resources available for building models, the system uses at least a subset of compute resources available to build the set of one or more models. As an example, the system allocates as many resources as possible from among the set of compute resources available to build subsets of the one or more models in parallel with each other. The set of compute resources available for building models may be defined by one or more boundary conditions, including any one or more of a predetermined number of compute resources for building models, a predetermined percentage of system compute resources, a remaining set of compute resources after taking into account allocations of resources for other system processes, etc. Related art systems that build models with respect to a dataset generally train the various models serially. Such serialization of model building is generally time intensive, particularly as the size of the dataset scales. In contrast, the parallelization of the building the set of one or more models speeds up the time used to build the models. As an example, if a single virtual machine with four cores is deployed to train the models, the system is able to train the set of models in a time that is faster than the serialized process of the related art. As another examples, if Apache Spark™ is used to deploy clusters of virtual machines to train the set of one or more models (e.g., if clusters of virtual machines are spun up specifically to train the set of one or more models), the system is able to train the set of models in a time that is significantly faster than the serialized process of the related art. In some embodiments, the dataset and/or the model being trained is cached during the training of the set of one or more models. Such caching of the dataset contributes to significant gains in efficiency-related art systems generally have to loop over datasets that are acquired while the dataset is stored in a data store (e.g., a back-end storage).

In some embodiments, the system allocates additional resources to the training/tuning of a set of models for a dataset in response to a determination to improve the quality of service associated with training/tuning the set of models. As an example, the system may determine that the quality of service is to be improved in response to a determination that a length of time to train/tune a model exceeds a predetermined threshold period of time. As another example, the system may determine that the quality of service is to be improved in response to a request received from a user (e.g., via a user interface, etc.) to speed up the process of training/tuning the set of models.

The system assigns a respective one of the models to be built by each compute resource (e.g., the compute resources selected to build, train, or fit the models), and the compute resources build the models. In some embodiments, the compute resources working in parallel respectively build different models at a particular time. As an example, the different models across the set of compute resources working in parallel have no dependence because the models and corresponding datasets are isolated. The building of a model by compute resources includes caching the corresponding dataset for which a model is to be built, obtaining a set of starting parameters, and training the model based at least in part on information comprised in the dataset (e.g., information pertaining to the dimension along which the model is being built) and/or the set of starting parameters. The caching of the corresponding dataset and the set of starting parameters comprises obtaining information from fields (e.g., rows) of the dataset, storing the information in a table, and storing parameters for tuning or parameterizing the meta-grouped models (e.g., the set of one or more models to be built for a dataset). The compute resource caches the model and optimizes the model based at least in part on running an iteration over various sets of parameters and selecting a best version of the set of model versions obtained by the corresponding iterations. For example, optimization of the model includes running the respective optimizing process, which includes performing at least a number of iterations of training the particular model of the plurality of respective models to be optimized. In some embodiments, a compute resource building a particular model iterates over a set of combinations or permutations of parameters. The compute resource may implement a threshold maximum number of parameters and iterate over a set of combinations or permutations of different parameters constrained by threshold maximum number of parameters. For example, the system may use a maximum of 15 parameters for building a model. Constraining the training/building the model based at least in part on threshold maximum number of parameters speeds up an optimization or deployment of models and/or predictions. In some embodiments, the best version of the model is selected based at least in part on one or more predetermined criteria (e.g., best value for optimization metric(s) determined during the optimization process—for example, metric(s) measuring the difference between model produced predictions/forecasts and training model data for a given set of parameters). Examples of the one or more predetermined criteria include: a most accurate prediction, a best fit, an accuracy of a prediction that exceeds a predefined accuracy threshold in conjunction with a variability of an inaccuracy being below a predefined variability threshold, a speed by which a model provides a prediction (e.g., a prediction that satisfies a minimum threshold of accuracy), etc. In some embodiments, optimization ends after a maximum number of iterations permitted for tuning the model. In some embodiments, optimization ends after minimizing over iteratively tuning the model (e.g., iterating until an error is below a threshold, an error is reducing less than a percentage, etc.). Various other criteria may be implemented. In some embodiments, a compute resource iterates over the set of parameters until a model converges on a solution (e.g., an optimal or best model).

According to various embodiments, the system intelligently selects a set of parameters with which to build a model (e.g., train, fit, optimize, tune, etc.). The system may use a search space, such as a Bayesian space, in connection with determining the set of parameters to use. In some embodiments, the system stores historical information pertaining to models, such as information pertaining to building models. The system may store historical information pertaining to models for a particular dataset, and/or historical information pertaining to models across various, etc. According to various embodiments, the system uses the historical information in connection with selecting parameters for building other models (e.g., other models for the same dataset, other models for other datasets such as models providing a same type of prediction, etc.). In some embodiments, the system uses the historical information pertaining to models to select a set of parameters with which to build (e.g., create or update a model). For example, in connection with building a particular model, the system uses the historical information pertaining to the building of the particular model such as an optimal set of parameters, or a set of parameters over which to iterate, etc. In some embodiments, the system determines a histogram of parameters used for optimal models. In some embodiments, one or more performance characteristics are used to generate a parameter space or a histogram of parameters, and the parameter space or histogram of parameters is used to select optimal parameters with which to optimize the at least one model of the plurality of models. In some embodiments, the parameter space comprises a histogram of parameters. In some embodiments, an initial set of optimized models and parameters associated with the optimized models are used to determine or preselect parameters a model. In some embodiments, an n-dimensional vector of parameters is reduced to determine the set of parameters for a model. In connection with a subsequent building of the model, the system queries the dataspace of historical parameters, searches for parameters that are used for models (or versions of a model) that exceed a predetermined performance threshold, and iterates building of the model using the parameters. The predetermined performance threshold may be configurable such as by an administrator (e.g., a system administrator, a user administrator, etc.). For example, the predetermined performance threshold is set according to a desired quality of service such as a time to update a model.

In some embodiments, a set of historical information pertaining to a model is configurable by a user. As an example, the system may be configured to store the dataset used to build (or update) the model. As another example, the system may be configured to store a threshold amount of historical information pertaining to the model or a historical information corresponding to one or more types of information.

In some embodiments, a set of different compute resources used to build models is assigned to a same model, and each set of different compute resources iterates over different sets of parameters. The best version is selected from among the model versions obtained from the set of different compute resources. Although the set of different compute resources can optimize the model in parallel, a greater number of total iterations (e.g., an aggregate of iterations across the set of different compute resources) is required before the model converges on an optimal (or best) model.

According to various embodiments, the system iterates over the set of dimensions corresponding to a dataset (e.g., the set of models to be built for a dataset). For example, all or a subset of the models are built in parallel (e.g., by different compute resources). In the case that the system builds a subset of the models in parallel, for each of the subset of models being built in parallel, the system iterates over the various parameters to optimize the corresponding model (e.g., for a particular dimension of the dataset), and in response to a compute resource determining the optimal model, the system iterates over the remaining models that are to be built for a dataset. For example, in response to determining an optimal model (e.g., the optimized model), the system then selects a remaining model for the dataset (e.g., among the set of models for a dataset) and builds the selected model.

Over time the predictions a model is able to provide may become less and less accurate. The change in the accuracy of the model may be attributed to temporal drift of the data for which the model is making predictions. As an example, in the case of a model for a grocery chain, a model may correspond to a prediction of sales for a typical item. Over time user preferences or purchasing trends may change. As the difference between the current data and the data used to build a model increases, the accuracy of a prediction for the corresponding model may decrease. Accordingly, maintaining (e.g., building/rebuilding a model) over time ensures that the model continues to provide accurate predictions.

According to various embodiments, the system automatically builds (e.g., updates) a set of models (e.g., a set of models corresponding to a particular dataset). As an example, the system may automatically build the set of models according to a predetermined schedule or according to a predetermined interval. Examples of the predetermined interval include daily, weekly, monthly, etc. In some embodiments, the rebuilding of a set of models is similar to the building of the set of models. Building the set of models comprises determining a set of compute resources to train the set of models, allocate a model (e.g., selected from the set of models) to each compute resource within the set of compute resources, and build the model using current data (e.g., a most recent dataset corresponding to the model), and iterate over the set of models for the dataset (e.g., the remaining set of models to be built).

In some embodiments, building a particular model comprises caching the corresponding dataset for which a model is to be built (e.g., a current dataset), obtaining a set of starting parameters, and updating the model based at least in part on information comprised in the dataset (e.g., information pertaining to the dimension along which the model is being built) and/or the set of starting parameters. The caching of the corresponding dataset and the set of starting parameters comprises obtaining information from fields (e.g., rows) of the dataset, storing the information in a table, and storing parameters for building or parameterizing the meta-grouped models (e.g., the set of one or more models to be built for a dataset). The compute resource caches the model and optimizes the model based at least in part on running an iteration over various sets of parameters and selecting a best version of the set of model versions obtained by the corresponding iterations. In some embodiments, a compute resource building a particular model iterates over a set of combinations or permutations of parameters. The compute resource may implement a threshold maximum number of parameters and iterate over a set of combinations or permutations of different parameters constrained by a threshold maximum number of parameters. In some embodiments, the set of parameters with which to build a model is selected is based at least in part on a set of parameters previously used to build the model (e.g., using the initial dataset or in connection with a previous tuning of the model) and/or a set of parameters used to build a different model (e.g., a similar model such as a model used to provide a same type of prediction, a model used for a similar organization such as models across two organizations in a same industry, etc.). In some embodiments, building a model comprises tuning a model, wherein tuning comprises the selection of optimal training parameters to utilize during optimization. In some embodiments, building a model comprises training a model, wherein training comprises the act of optimizing to a set of data a model that has been configured with tunable parameters. In some embodiments, a much smaller space of tuning parameters is estimated for forecasting groups of models that share seasonality/general trend attributes (e.g., by top-down, bottom-up, or hierarchical clustering of the discrete series based on a relationship amongst aggregations).

In some embodiments, the system provides an interface via which the set of models is exposed to a user or another system (e.g., a customer system). In some embodiments, the set of models associated with the dataset is exposed as a single or as a composite model. As an example, the composite model is exposed via an application programming interface (API). A user (or another system) may submit a query with respect to the set of models in connection with obtaining a prediction for an attribute using a model generated (e.g., built, trained, etc.) based at least in part on the dataset. In some embodiments, the query is submitted via the interface exposing the composite model. In response to receiving the query, the system determines the applicable model (e.g., a model selected from among the set of models comprised in the composite model) to invoke (e.g., use) to provide the prediction, and invokes the applicable model to obtain the prediction. The system may determine the applicable model based at least in part on one or more parameters of the received query, such as boundary conditions of the prediction, an attribute for which a predicted value is being requested, etc. Related art systems require a user to manually navigate (e.g., scroll through) all available models and to manually select a particular model to use in connection with obtaining a prediction or programmatically maintain a state of training parameters for each discrete series within a metadata store, fetching these parameters for each subsequent prediction based on configurations that have been written. However, at scale, a single database may have thousands of associated models. Accordingly, manually finding a particular model, selecting the model, and querying the model is burdensome and inconvenient for a user. Various embodiments improve deficiencies of related art systems based at least in part on generating a composite model that comprises the set of models associated with a particular dataset and determining a particular subset of the models associated with a particular dataset to invoke in order to provide a prediction.

According to various embodiments, the composite model comprises a serialization of information pertaining to the set of one or more models associated with the dataset. For example, the composite model for a dataset comprises one or more of a serialization of a model artifact corresponding to a respective model of the one or more models, an indication of parameters tested in building the respective model, an indication of metrics evaluated by the respective model, etc. Various other information pertaining to the set of one or more models may be stored in the composite model. In some embodiments, the system uses the information pertaining to the set of one or more models associated with the dataset to determine a particular model to invoke in connection with providing a response to a query received with respect to the composite model.

In some embodiments, one or more of the set of models comprised in the composite model is wrapped in an API (e.g., anAPI for one or more models within the composite model) that corresponds to the methods or functionality of the particular one or more models (e.g., a fitting process, a predicting process, a forecasting process, etc.). In some embodiments, the API wraps underlying different types of libraries that are capable of producing their own types of models that are grouped together, wherein the libraries have their own nuances and have entry points that are customized to each of them. In some embodiments, a unified API is provided by 1) selecting a forecasting library (i.e., Prophet); 2) manipulating the data to support training a bunch of models associated with the library (e.g., Prophet models) in parallel, one model per each configured group of data; 3) giving a unified API to interface with each of the distinct but homogenous models (e.g., Prophet models instead of, for example, pmdrima or statsmodels). Examples of functions or features provided by (e.g., accessible via) the API include a fitting function, a prediction function, a cross validation function, a performance metric calculation function, a cross validation and scoring function (e.g., a running of a back-testing cross validation scoring for each time series specified within the model after a fitting has been performed), an extraction function for extracting model parameters for the model, a forecasting function, a saving function for saving a model, a loading function for loading a model, etc. The system may receive, via an interface (e.g., a user interface), a query with respect to the composite model, the system may determine the particular model to invoke in connection with providing a response to the query, and in response to determining the particular model, the system configures the query based at least in part on the particular model (e.g., using an API) and provides the query to the particular model (e.g., via the API).

FIG. 1 is a block diagram of a system for building and tuning a model according to various embodiments of the present application.

In the example illustrated in FIG. 1, system 100 includes model management service 110, data store 120, administrator system 130, and/or client system 140. In some embodiments, model management service 110 and data store 120 are integrated (e.g., combined into a layer or a single set of server(s)). In some embodiments, model management service 110 comprises data layer 112, model control layer 114, and/or business application layer 116. System 100 further includes one or more networks such as network 150 over which administrator system 130 and/or client system 140 communicates with model management service 110 and/or data store 120. In various embodiments, network 150 includes one or more of a wired network, and/or a wireless network such as a cellular network, a wireless local area network (WLAN), or any other appropriate network. In some embodiments, data layer 112, model control layer 114, and/or business application layer 116 are respectively implemented by one or more servers. System 100 may include various other systems or terminals.

According to various embodiments, model management service 110 comprises data layer 112, model control layer 114, and/or business application layer 116. Model management service 110 uses data layer 112 to store one or more datasets, one or more models, and/or information pertaining to the datasets or models (e.g., historical information pertaining to a model such as an indication of a set of parameters used to train a model, etc.) on data store 120. Model management service 110 also uses data layer 112 to obtain datasets used in connection with building or tuning models (e.g., to retrieve the datasets from data store 120, and/or store the datasets in cache during the building/turning of the models, etc.), to train a set of one or more models for a dataset, to obtain a prediction or other result from a dataset or a model associated with the dataset (e.g., in response to model management service 110 receiving a query from a user such as via client system 140), to receive updated datasets (or information to be stored/updated in the currently stored datasets), etc., Data layer 112 services queries received in connection with a user analyzing, or requesting, a prediction determined by invoking a model stored in data store 120 and/or information comprised in a log of transactions with respect to files in the dataset. Model management service 110 uses model control layer 114 as a control plane for building sets of models corresponding to a set of datasets and updating the respective sets of models (e.g., in response to drift in the information comprised in the corresponding dataset, etc.). Model management service 110 uses model control layer 114 as a control plane for determining a composite model for a particular dataset based on the set of one or more models built/updated for a particular dataset. Model management service 110 further uses model control layer 114 to analyze queries (e.g., a query received from a user such as via client system 140) to determine a corresponding dataset, and at least one model (e.g., of the set of one or more models built for the dataset) to be used in connection with providing a response to the query. As an example, the at least one model may be determined based at least in part on one or more query parameters comprised in the query such as a type of prediction (e.g., forecasted sales, etc.), a scope of the prediction (e.g., a geographic location, a particular store, a particular item or type of item, a particular department, a particular brand, etc.), a temporal bounding condition (e.g., a future date-time, or range thereof such as a particular number of days, weeks, months, or years from the present day). In some embodiments, the at least one model is comprised in (or pointed to or invoked by) the composite model for the dataset. In some embodiments, in response to determining the at least one model, model control layer 114 causes data layer 112 to service the query using the at least one model and the corresponding dataset.

According to various embodiments, model management service 110 provides an input interface via which a first entity inputs a dataset, receives the dataset, and provides a selection interface that exposes to a second entity the plurality of models determined for the dataset and/or the plurality of results corresponding to the plurality of models using the index entries. In various embodiments, the first entity and the second entity respectively correspond to: a first user and a second user, a user and an application, an application and a user, or a first application and a second application. In some embodiments, the dataset comprises a plurality of keys and a plurality of key-value relationships. In some embodiments, the dataset is formatted according to a predefined format and includes index entries that are generated for a plurality of models and a plurality of results corresponding to the plurality of models.

According to various embodiments, model management service 110 receives a dataset (e.g., the dataset comprising a plurality of keys and a plurality of key-value relationships), determines a plurality of models to build based at least in part on the dataset, builds the plurality of models, and optimizes at least one of the plurality of models. In some embodiments, determining the plurality of models to build comprises using the dataset format information to identify the plurality of models.

According to various embodiments, model management service 110 determines a set of one or more models to optimize, determines a plurality of optimizer modules with which to optimize the set of one or more models, causes the plurality of optimizer modules to respectively perform a respective optimizing process with respect to at least one model of the set of one or more models, and deploys an optimized model obtained based at least in part on optimizing metrics.

Model control layer 114 receives an indication that model management service 110 receives a dataset. As an example, the dataset is received in connection with a request for model management service 110 to determine and/or build a set of models with respect to the dataset. In response to receiving the dataset, model control layer 114 determines the set of models to build with respect to the dataset. As an example, model control layer 114 determines the set of models to build based at least in part on a format or syntax of the dataset. For example, the dataset comprises a plurality of keys and corresponding values. In some embodiments, the plurality of keys correspond to a plurality of columns of the dataset. In some embodiments, a particular key corresponds to a grouping of columns of the dataset. According to various embodiments, in response to receiving the dataset, model control layer 114 analyzes the dataset and extracts at least a subset of the plurality of keys. In response to determining at least a subset of the plurality of keys, model control layer 114 determines the set of models to be built with respect to the dataset. For example, the plurality of keys are indicative of the set of models to be built with respect to the dataset. A user may use client system 140 to instruct model management service 110 of the desired set of models to be built (or the predictions for which the system is to generate with respect to the dataset). For example, the user uses client system 140 to upload the dataset via the interface, and in response to receiving the dataset, the model management service 110 builds (e.g., trains) the set of models. As a further example, model management service 110 automatically builds the set of models in response to receiving the dataset (e.g., the set of models are trained contemporaneous with the dataset being uploaded, the set of models are queued in a batch model training process, etc.).

Model control layer 114 exposes to a user or to other systems a set of models for a dataset. According to various embodiments, in response to determining the set of one or more models to build, model control layer 114 causes data layer 112 to build the models and optimize the models and provides (or exposes) the set of one or more models via an interface such as via business application layer 116. As an example, the set of one or more models is exposed to a user via an application programming interface (API) and/or a web interface, etc. In some embodiments, model control layer 114 exposes the set of one or more models in (or referenced/subject to a pointer by) a composite model. For example, model control layer 114 determines a composite model that comprises (or references) the set of one or more models for the dataset. According to various embodiments, the composite model exposes the set of one or more models in a unified model that is configured to service queries to any one of the set of one or more models for the dataset. Model management service 110 (e.g., model control layer 114) uses composite model to determine the applicable model(s) to invoke with respect to a query, obtains the corresponding results from the applicable model(s), and provides the result to the query. In some embodiments, the composite model aggregates results from a plurality of models to obtain a result to the query received with respect to the composite model (e.g., a query to receive total expected sales of a particular store may include aggregating predictions of sales for each item sold at the store, etc.).

In response to determining the set of one or more models to build based at least in part on the dataset (e.g., in response to determining dimensions of the dataset along which models are to be built), model management service 110 (e.g., model control layer 114) causes data layer 112 to build the one or more models. In some embodiments, data layer 112 builds the one or more models based on a batch process. Data layer 112 builds at least a subset of the one or more models in parallel with each other. In response to determining to build the set of one or more models, model management service 110 (e.g., data layer 112, etc.) determines a set of compute resources (e.g., threads, compute nodes, processor cores, etc.) to allocate to the building of the one or more models (or subsets thereof). As an example, model management service 110 determines a set of compute resources available for building models. In response to determining the set of compute resources available for building models, model management service 110 uses at least a subset of compute resources available to build the set of one or more models. As an example, model management service 110 allocates as many resources as possible from among the set of compute resources available to build subsets of the one or more models in parallel with each other. In some embodiments, model management service 110 determines the set of compute resources available for building models based at least in part on one or more boundary conditions. Examples of the one or more boundary conditions include any one or more of a predetermined number of compute resources for building models, a predetermined percentage of system compute resources, a remaining set of compute resources after taking into account allocations of resources for other system processes, etc. Various other boundary conditions are possible. In some embodiments, model management service 110 (e.g., data layer 112) invokes Apache Spark™ to deploy clusters of virtual machines to train the set of one or more models. For example, model management service 110 causes cluster(s) of virtual machines to be spun up specifically to train the set of one or more models. In some embodiments, a number of compute resources is configurable such as based at least in part on a quality of service to provide with respect to a dataset (e.g., a quality of service committed to a user, etc.). If model management service 110 determines to increase a speed by which the set of one or more models is trained with respect to a dataset, model management service 110 allocates additional compute resources to the training of the set of one or more models (e.g., a greater number of such models may be trained in parallel). For example, model management service 110 causes additional virtual machines or clusters to be spun up in connection with training the set of one or more models. In some embodiments, model management service 110 determines to increase a speed by which to train the set of one or more models in response to receiving a request from a user such as via client system 140, or in response to determining that a time incurred to train the set of one or more models is greater than an expected training time or that, based on an update of the training, the expected training time exceeds a deadline by which the set of models are to be made available (e.g., exposed to a user, customer, etc.) such as a date/time initially indicated or promised to a user or other system.

Model management service 110 assigns a respective one of the models to be built to each compute resource (e.g., each of the compute resources selected to build the models), and model management service 110 causes (e.g., invokes) the compute resources to build the models. In some embodiments, the compute resources working in parallel respectively build different models at a particular time. As an example, data layer 112 respectively caches the dataset/models for the compute resources for the different models being built across the set of compute resources working in parallel. Accordingly, the models being trained in parallel have no dependence on one another (e.g., the models and corresponding datasets are isolated from each other).

Model management service 110 uses a compute resource to build a model based at least in part on caching the corresponding dataset for which a model is to be built, obtaining a set of starting parameters, and training the model based at least in part on information comprised in the dataset (e.g., information pertaining to the dimension along which the model is being built) and/or the set of starting parameters. The caching of the corresponding dataset and the set of starting parameters comprises obtaining information from fields (e.g., rows) of the dataset, storing the information in a table, and storing parameters for tuning or parameterizing the meta-grouped models (e.g., the set of one or more models to be built for a dataset). The compute resource caches the model and optimizes the model based at least in part on running an iteration over various sets of parameters and selecting a best version of the set of model versions obtained by the corresponding iterations. In some embodiments, model management service 110 (e.g., model control layer 114 or data layer 112) selects a best model (also referred to herein as an optimized model) among the set of versions of a model that are built by a corresponding compute resource (e.g., a set of versions of a model trained along a dimension corresponding to the dataset). In some embodiments, a compute resource building a particular model iterates over a set of combinations or permutations of parameters. In some embodiments, model management service 110 (e.g., data layer 112) implements a threshold maximum number of parameters that are to be used by compute resources to iterate over a set of combinations or permutations of different parameters constrained by threshold maximum number of parameters. For example, model management service 110 implements a maximum of 15 parameters for building a model. As another example, model management service 110 implements a maximum of 10 parameters for building a model. As another example, model management service 110 implements a maximum of 20 parameters for building a model. Various other values may be implemented as the threshold maximum number of parameters. In some embodiments, model management service 110 selects the best version of the model based at least in part on one or more predetermined criteria. Examples of the one or more predetermined criteria include: a most accurate prediction, a best fit, an accuracy of a prediction that exceeds a predefined accuracy threshold in conjunction with a variability of an inaccuracy being below a predefined variability threshold, a speed by which a model provides a prediction (e.g., a prediction that satisfies a minimum threshold of accuracy), etc. In some embodiments, optimizers retain state history of the iterative process and can either: a) stop when maximum allowable iterations are reached; or b) stop when 1) there is no improvement over N iterations, 2)

there is improvement, but it is too little to justify continuing (e.g., the error improvement falls below a threshold), or 3) the error gets worse. Various other criteria may be implemented. In some embodiments, model management service 110 causes a compute resource to iterate over the set of parameters until a model converges on a solution (e.g., an optimal or best model).

In some embodiments, model management service 110 intelligently selects a set of parameters with which to train a model (e.g., build, optimize, tune, etc.). In some embodiments, model management service 110 (e.g., model control layer 114 or data layer 112) stores historical information pertaining to models, such as information pertaining to the training models. For example, model management service 110 stores historical information pertaining to models for a particular dataset, and/or historical information pertaining to models across various, etc. Model management service 110 (e.g., model control layer 114 and/or data layer 112) uses the historical information in connection with selecting parameters for training other models (e.g., other models for the same dataset, other models for other datasets such as models providing a same type of prediction, etc.). In some embodiments, model management service 110 uses the historical information pertaining to models to select a set of parameters with which to tune (e.g., update a model). For example, in connection with tuning a particular model, model management service 110 uses the historical information pertaining to the training of the particular model such as an optimal set of parameters, or a set of parameters over which to iterate, etc.

In some embodiments, model management service 110 determines a histogram of parameters used for optimal models. In connection with a subsequent tuning the model, model management service 110 queries the dataspace of historical parameters, searches for parameters that are used for models (or versions of a model) that exceed a predetermined performance threshold, and iterates a tuning of model using the parameters. The predetermined performance threshold may be configurable such as by an administrator (e.g., a system administrator, a user administrator, etc.). For example, the predetermined performance threshold is set according to a desired quality of service such as a time to update a model.

Model management service 110 uses data layer 112 to store the set of historical information pertaining to a model, such as to store such information at data store 120. The set of historical information pertaining to a model to be stored by management model service 110 is configurable by a user. As an example, the system may be configured to store the dataset used to train (or update) the model. As another example, the system may be configured to store a threshold amount of historical information pertaining to the model or a historical information corresponding to one or more types of information.

According to various embodiments, data layer 112 iterates over the set of dimensions corresponding to a dataset (e.g., the set of models to be trained for a dataset). For example, data layer 112 deploys compute resources to train all or a subset of the models in parallel (e.g., by different compute resources). In the case that data layer 112 trains/tunes a subset of the models in parallel, for each of the subset of models being trained/tuned in parallel, data layer 112 iterates over the various parameters to optimize the corresponding model (e.g., to determine the corresponding optimized model), and in response to determining the optimal model, data layer 112 iterates over the remaining models that are to be trained for a dataset. For example, in response to determining an optimal model (e.g., the optimized model), data layer 112 then selects a remaining model for the dataset (e.g., among the set of models for a dataset) and trains/tunes the selected model.

According to various embodiments, model management service 110 automatically tunes (e.g., updates) a set of models (e.g., a set of models corresponding to a particulate dataset). As an example, model management service 110 automatically tunes the set of models according to a predetermined schedule or according to a predetermined interval. Examples of the predetermined interval include once a day, every two days, every three days, once a week, every two weeks, every three weeks, once a month, every two months, every three months, every year, etc. As another example, model management service 110 automatically tunes the set of models according to a predetermined triggering condition such as detection of a minimum drift threshold between the dataset used to train the set of models and a current dataset. In some embodiments, the tuning of a set of models is similar to the building of the set of models. Management model service 110 determines a set of compute resources to train the set of models, allocates a model (e.g., selected from the set of models) to each compute resource within the set of compute resources, and tunes the model using current data (e.g., a most recent dataset corresponding to the model), and iterates such process over the set of models for the dataset (e.g., the remaining set of models to be tuned).

In some embodiments, tuning a particular model comprises caching the corresponding dataset for which a model is to be tuned (e.g., a current dataset), obtaining a set of starting parameters, and updating the model based at least in part on information comprised in the dataset (e.g., information pertaining to the dimension along which the model is being built) and/or the set of starting parameters. The caching the corresponding dataset and the set of starting parameters comprises obtaining information from fields (e.g., rows) of the dataset, storing the information in a table, and storing parameters for tuning or parameterizing the meta-grouped models (e.g., the set of one or more models to be built for a dataset). The applicable compute resource (or data layer on behalf of the compute resource) caches the model and optimizes the model based at least in part on running an iteration over a various sets of parameters and selecting a best version of the set of model versions obtained by the corresponding iterations. In some embodiments, a compute resource building a particular model iterates over a set of combinations or permutations of parameters. For example, data layer 112 implements a threshold maximum number of parameters for which the corresponding compute resource is to iterate, and the compute resource iterates over a set of combinations or permutations of different parameters constrained by a threshold maximum number of parameters. In some embodiments, the set of parameters with which to tune a model is selected based at least in part on a set of parameters previously used to train/tune the model (e.g., using the initial dataset or in connection with a previous tuning of the model) and/or a set of parameters used to train/tune a different model (e.g., a similar model such as a model used to provide a same type of prediction, a model used for a similar organization such as models across two organizations in a same industry, etc.).

In some embodiments, model management service 110 (e.g., model control layer 114) provides an interface via which the set of models is exposed to a user or another system (e.g., a customer system). In some embodiments, model control layer 114 exposes the set of models associated as a single or composite model. As an example, the composite model is exposed via an application programming interface (API) via which business application layer 116 accesses (e.g., queries) the composite model such as in connection with a task or request of an application running on a business application layer. As another example, the composite model is exposed via an interface such as a web interface provided to other systems such as client system 140. A user (or another system) can submit a query with respect to the set of models in connection with obtaining a prediction for an attribute using a model generated (e.g., built, trained, etc.) based at least in part on the dataset. In some embodiments, the user submits the query to the interface exposing the composite model (e.g., the interface is exposed to client system 140). In response to receiving the query, model management service 110 determines the applicable model (e.g., a model selected from among the set of models comprised in the composite model) to invoke (e.g., use) to provide the prediction, and invokes the applicable model to obtain the prediction. In some embodiments, model management service 110 determines the applicable model based at least in part on one or more parameters of the received query, such as boundary conditions of the prediction, an attribute for which a predicted value is being requested, etc.

In some embodiments, model management service 110 wraps the one or more of the set of models comprised in the composite model in an API (e.g., a slightly different API relative to other models within the composite model) that corresponds to the methods or functionality of the particular one or more models (e.g., a fitting process, a predicting process, a forecasting process, etc.). Examples of methods or functions or features provided by (e.g., accessible via) the API include a fitting function, a prediction function, a cross validation function, a performance metric calculation method or function, a cross validation and scoring method or function (e.g., a running of a back-testing cross validation scoring for each time series specified within the model after a fitting has been performed), an extraction method or function for extracting model parameters for the model, a forecasting method or function, a saving method or function for saving a model, a loading method or function for loading a model, etc. Model management service 110 receives, via an interface (e.g., a user interface), a query with respect to the composite model, determines the particular model to invoke in connection with providing a response to the query, and, in response to determining the particular model, configures the query based at least in part on the particular model (e.g., the API for the model) and provides the query to the particular model (e.g., via the API).

According to various embodiments, model control layer 114 receives an indication that an application invoked via business application layer 116 is attempting to query a dataset or the set of one or more models (e.g., the corresponding composite model, etc.) for a dataset, such as a dataset or model stored on data store 120. Model control layer 114 determines at least one model associated with the dataset to be used in providing a response to the query, and causes (e.g., instructs, requests, etc.) data layer 112 to perform the query such as by invoking the model to obtain a requested prediction, etc.

According to various embodiments, business application layer 116 provides an interface via which a user (e.g., using client system 140) may interact with various applications such as a development application for developing a feature or model for analyzing the data stored in data store 120 (e.g., with respect to a dataset), an application to access files stored in a dataset (e.g., a dataset stored in data store 120), an application to query a model, an application to obtain a prediction, an application to tune or update a model, an etc. Various other applications can be provided by business application layer 116. For example, a user queries data layer 112 by sending a query/request to business application layer 116, which interfaces with data layer 112 to obtain information responsive to the query (e.g., business application layer 116 formats the query according to the applicable syntax and sends the formatted query to data layer 112). As another example, an administrator uses an interface provided/configured by business application layer 116 to configure (e.g., define) one or more security policies including access permissions to files and/or one or more policies pertaining to querying models.

According to various embodiments, data store 120 stores raw data such as source data that is used to determine a feature, to train a model (e.g., a dataset), to apply a model, to determine a set of starting parameters (e.g., a set of parameters to initially use to train a model), etc. Data store 120 stores historical information pertaining to models such as information pertaining to a dataset used to train a model, a set of parameters used to train a model, a set of parameters used to train various versions of a model along a particular dimension of a dataset, a mapping of parameters to models, a mapping of parameters to types of models, etc. Data store 120 stores one or more files pertaining to a dataset.

According to various embodiments, system 100 comprises an administrator system 130 for use by an administrator such as an administrator of model management service 110. For example, administrator system 130 comprises a system for communication, data access, computation, etc. An administrator uses administrator system 130 to maintain data store 120 (e.g. maintain raw data or files comprised in data store 120) and/or one or more policies or thresholds (e.g., a threshold maximum number of parameters, threshold periods of time, thresholds pertaining to a minimum accuracy for an optimized model, a performance threshold such as pertaining to a performance of a model, etc.). Administrator system 130 communicates with model management service 110 via a web-interface. For example, administrator system 130 communicates with model management service 110 via a web-browser installed on administrator system 130. As an example, administrator system 130 communicates with model management service 110 via an application running on administrator system 130.

According to various embodiments, system 100 comprises client system 140. Client system 140 is used by a user (e.g., a developer such as a developer of a feature, a developer of a model, etc.) to communicate with model management service 110 and/or data store 120. As an example, client system 140 communicates with model management service 110 via a web-interface. In some embodiments, a user uses client system 140 to modify a file at data store 120, to update one or more policies stored at model management service 110, to query data layer 112, etc.

In some embodiments, data layer 112, model control layer 114, and/or business application layer 116 are implemented on a single server or a plurality of servers. For example, model control layer 114 and data layer 112 are different modules running on a same server or set of servers. In some embodiments, model management service 110, and/or data store 120 are implemented on a single server or a plurality of servers.

Figure 2:
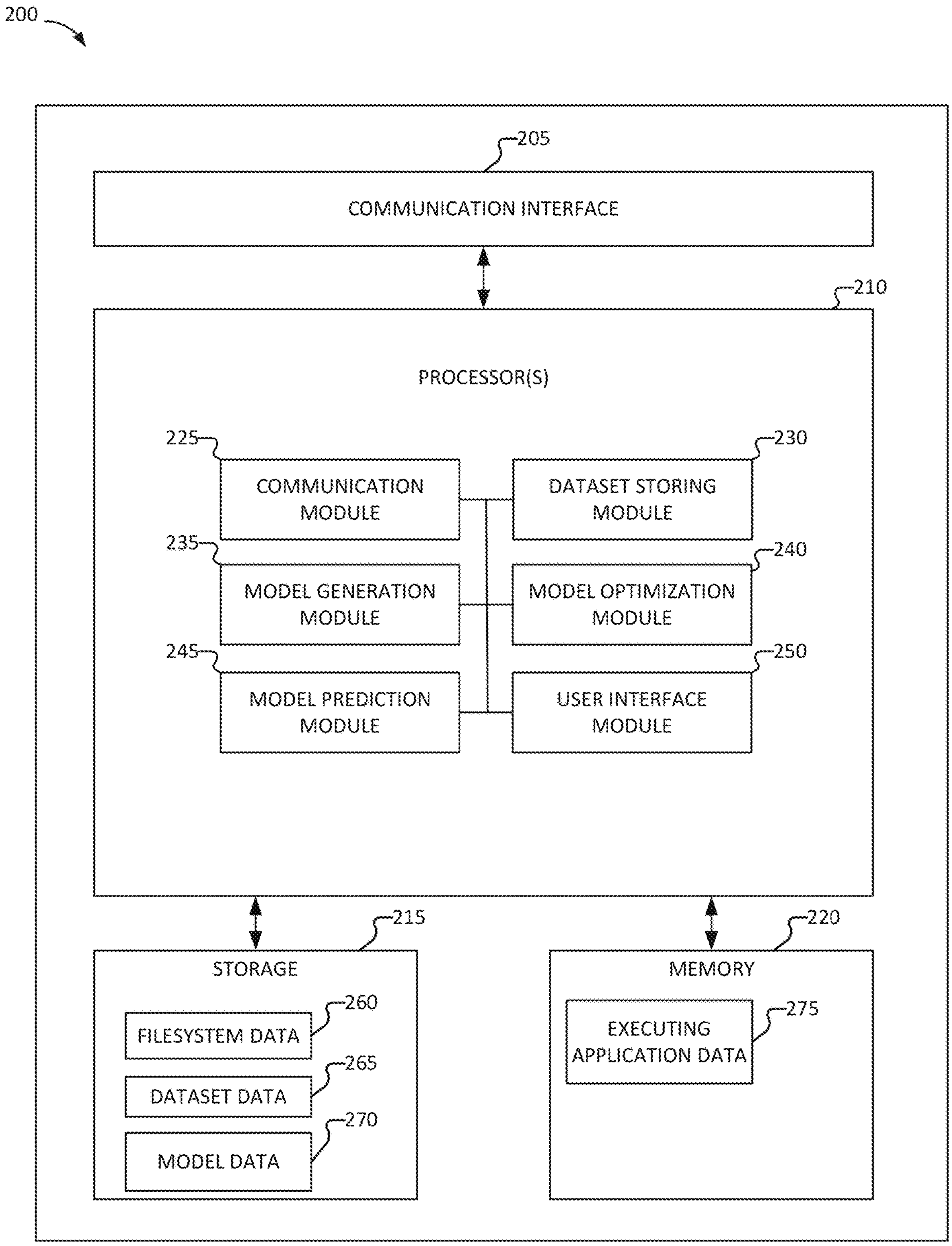
FIG. 2 is a block diagram of a model management service for building and deploying a model according to various embodiments of the present application.

FIG. 2 is a block diagram of a model management service for building and deploying a model according to various embodiments of the present application. According to various embodiments, system 200 of FIG. 2, system 300 of FIG.

Figure 4:
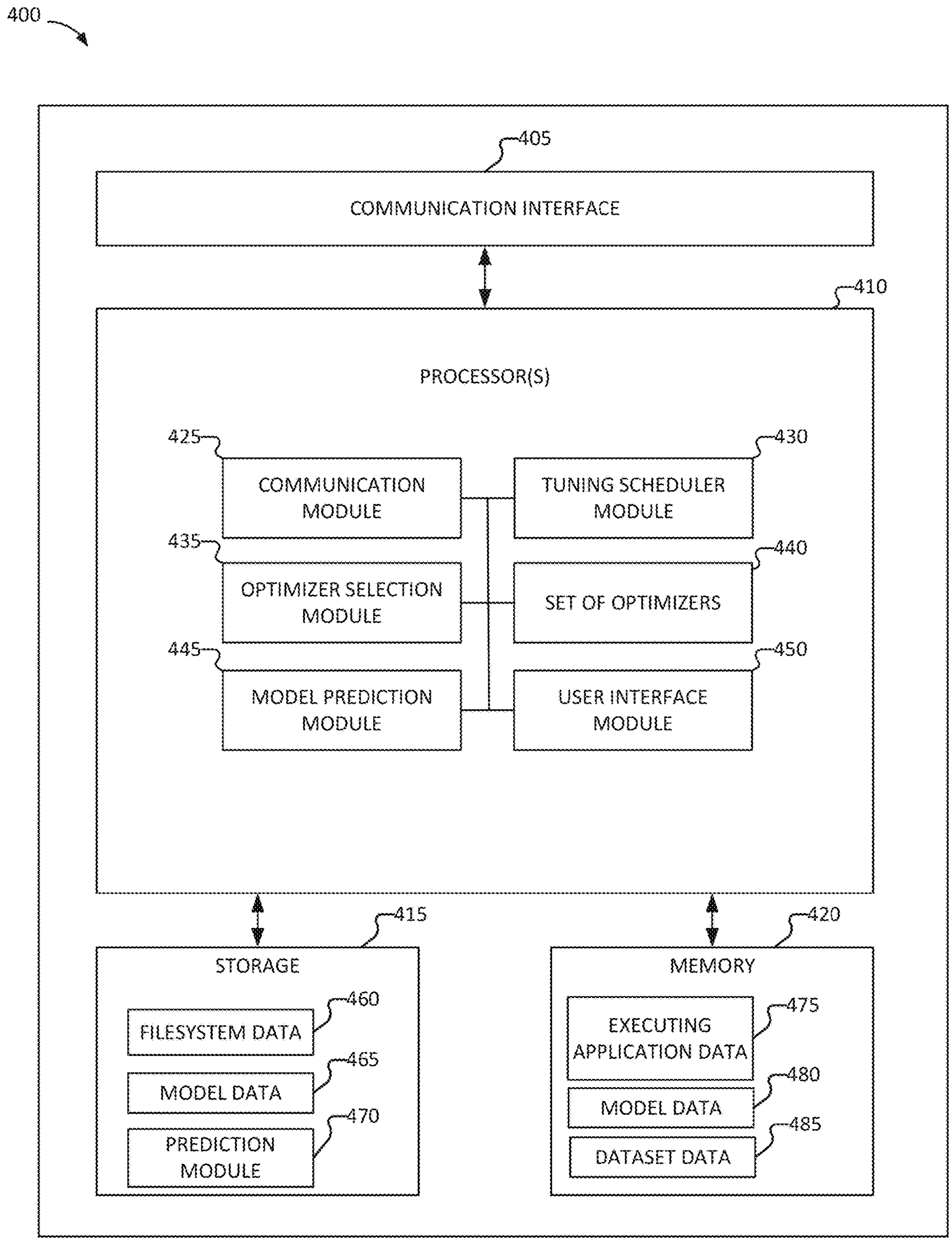
FIG. 4 is a block diagram of a model management service for tuning a deployed model according to various embodiments of the present application.

3, system 400 of FIG. 4, or any combination thereof are integrated into a single server or a set of servers.

According to various embodiments, system 200 implements at least part of system 100 of FIG. 1. In some embodiments, system 200 is implemented in connection with system 300 of FIG. 3 and/or system 400 of FIG. 4. In some embodiments, system 200 is implemented in connection with process 700 of FIG. 7, process 800 of FIG. 8, process 900 of FIG. 9, and/or process 1000 of FIG. 10.

In the example shown, system 200 implements one or more modules in connection with determining to build a set of one or more models with respect to a dataset, building the set of one or more models, and/or exposing the set of one or more models (e.g., to a user or other system). In some embodiments, system 200 is implemented in connection with receiving a dataset such as a dataset provided (e.g., uploaded) by a user, other system, etc. System 200 comprises communication interface 205, one or more processors 210, storage 215, and/or memory 220. One or more processors 210 comprises one or more of communication module 225, dataset storing module 230, model generation module 235, model optimization module 240, model prediction module 245, and/or user interface module 250.

In some embodiments, system 200 comprises communication module 225. System 200 uses communication module 225 to communicate with various other systems such as an application server, a data store, and/or client terminals or user systems such as a client system or an administrator system. For example, communication module 225 provides to communication interface 205 information that is to be communicated. As another example, communication interface 205 provides to communication module 225 information received by system 200. Communication module 225 is configured to receive one or more queries or requests to execute tasks (e.g., provide predictions from a model such as a composite model) such as from various client terminals or user systems, a file to store in a data store, an update to (or instruction to update) a model, a request to perform an operation (e.g., an operation that invokes a business transaction, etc.), a request to set one or more policies, etc. Communication module 225 is configured to provide to various client terminals or user systems information such as information that is responsive to one or more queries or tasks requested to be executed. In some embodiments, communication module 225 provides the information to the various client terminals or user systems information in the form of one or more reports (e.g., according to a predefined format or to a requested format), and/or via one or more user interfaces (e.g., an interface that client system 140 is caused to display). In some embodiments, communication module 225 is configured to receive information and/or an instruction pertaining to whether to build a model or to update a model, etc. In some embodiments, communication module 225 is configured to receive an updated dataset (e.g., for which an updated set of models is built/trained/tuned, etc.).

In some embodiments, system 200 comprises dataset storing module 230. System 200 uses dataset storing module 230 to obtain a dataset. In some embodiments, dataset storing module 230 provides an interface via which a dataset is provided to system 200 in connection with system 200 building and/or maintaining a set of models (e.g., one or more models) with respect to the dataset (e.g., a model that provides a prediction with respect to at least one dimension of the dataset). Dataset storing module 230 obtains a dataset that is received by system 200 via communication module 225. In response to receiving the dataset, dataset storing module 230 stores the dataset in a storage such as storage 215 or data store such as data store 120 of system 100 of FIG. 1. In some embodiments, dataset storing module 230 receives an updated dataset, or information with which system 200 is to update the dataset corresponding to a particular set of models. In response to receiving an updated dataset (or such other information), dataset storing module 230 updates the stored dataset (e.g., modifies, replaces, etc.). In addition, in some embodiments, dataset storing module 230 invokes a determination of whether a set of models for a dataset are to be tuned such as based on receiving the updated dataset, determining that information comprised in the dataset corresponding to a set of models has drifted (e.g., drifted beyond a predetermined drift threshold).

In some embodiments, system 200 comprises model generation module 235. System 200 uses model generation module 235 to analyze a dataset and uses the analysis to determine a set of one or more models to build based at least in part on the dataset (e.g., a set of models necessary to make predictions with respect to information pertaining to the dataset such as values for a particular key). In response to determining the set of one or more models to build, model generation module 235 builds (e.g., trains) the corresponding models.

In some embodiments, model generation module 235 analyzes the dataset and correspondingly determines the format of the dataset and the keys for the dataset. As an example, model generation module 235 extracts from the dataset the associated keys. Model generation module 235 determines the set of one or more models to build for a dataset based at least in part on the keys for the dataset. For example, the keys correspond to dimensions of the dataset along which models are to be built.

Model generation module 235 uses a machine learning process to train the set of models for the dataset. In connection with implementing the machine learning process, model generation module 235 determines a set of starting parameters with which to begin the training process. In response to determining the set of starting parameters, model generation module 235 trains the models based at least in part on the set of starting parameters and the dataset.

Model generation module 235 allocates compute resources for training the set of one or more models for the dataset. For example, in response to determining to build the set of one or more models, model generation module 235 determines a set of compute resources (e.g., threads, compute nodes, processor cores, etc.) to allocate to the building of the one or more models (or subsets thereof). In response to determining the set of compute resources available for building models, model generation module 235 uses at least a subset of compute resources available to build the set of one or more models. As an example, model generation module 235 allocates as many resources as possible from among the set of compute resources available to build subsets of the models in parallel with each other. In some embodiments, model generation module 235 determines the set of compute resources available for building models based at least in part on one or more boundary conditions. Examples of the one or more boundary conditions include any one or more of a predetermined number of compute resources for building models, a predetermined percentage of system compute resources, a remaining set of compute resources after taking into account allocations of resources for other system processes, etc. Various other boundary conditions may be implemented. In some embodiments, model generation module 235 invokes Apache Spark™ to deploy clusters of virtual machines to train the set of one or more models. For example, model generation module 235 causes cluster(s) of virtual machines to be spun up specifically to train the set of one or more models. In some embodiments, a number of compute resources is configurable such as based at least in part on a quality of service to provide with respect to a dataset (e.g., a quality of service committed to a user, etc.). If model generation module 235 determines to increase a speed by which the set of one or more models is trained with respect to a dataset, model generation module 235 allocates additional compute resources to the training of the set of one or more models (e.g., a greater number of such models may be trained in parallel). For example, model generation module 235 causes additional virtual machines or clusters to be spun up in connection with training the set of one or more models. In some embodiments, model generation module 235 determines to increase a speed by which to train the set of one or more models in response to receiving a request from a user such as via client system 140 of system 100 of FIG. 1, or in response to determining that a time incurred to train the set of one or more models is greater than an expected training time or that, based on an update of the training, the expected training time exceeds a deadline by which the set of models are to be made available (e.g., exposed to a user, customer, etc.) such as a date/time initially indicated or promised to a user or other system.

Model generation module 235 assigns a respective one of the models to be built by each compute resource (e.g., the compute resources selected to build the models), and model generation module 235 causes (e.g., invokes) the compute resources to build the models. In some embodiments, the compute resources working in parallel respectively build different models at a particular time. As an example, model generation module 235 respectively caches the dataset/models for the compute resources for the different models being built across the set of compute resources working in parallel. Accordingly, the models being trained in parallel have no dependence on one another (e.g., the models and corresponding datasets are isolated from each other).

Model generation module 235 uses a compute resource to build a model based at least in part on caching the corresponding dataset for which a model is to be built, obtaining a set of starting parameters, and training the model based at least in part on information comprised in the dataset (e.g., information pertaining to the dimension along which the model is being built) and/or the set of starting parameters. The caching of the corresponding dataset and the set of starting parameters comprises obtaining information from fields (e.g., rows) of the dataset, storing the information in a table, and storing parameters for tuning or parameterizing the meta-grouped models (e.g., the set of one or more models to be built for a dataset). The compute resource caches the model and runs an iteration over various sets of parameters. In response to iterating over the various parameters, model generation module 235 stores the various corresponding versions of the model (e.g., the versions of the model corresponding to the dimension along which the model is being optimized).

In some embodiments, system 200 comprises model optimization module 240. System 200 uses model optimization module 240 to select a best version (e.g., the optimized model) of the set of model versions obtained by the corresponding iterations. In some embodiments, model optimization module 240 selects a best model (also referred to herein as an optimized model) among the set of versions of a model that are built by a corresponding compute resource (e.g., a set of versions of a model trained along a dimension corresponding to the dataset). In some embodiments, a compute resource building a particular model iterates over a set of combinations or permutations of parameters. In some embodiments, model optimization module 240 implements a threshold maximum number of parameters that are to be used by compute resources to iterate over a set of combinations or permutations of different parameters constrained by threshold maximum number of parameters. Various values may be implemented as the threshold maximum number of parameters. In some embodiments, model optimization module 240 selects the best version of the model based at least in part on one or more predetermined criteria. Examples of the one or more predetermined criteria include: a most accurate prediction, a best fit, an accuracy of a prediction that exceeds a predefined accuracy threshold in conjunction with a variability of an inaccuracy being below a predefined variability threshold, a speed by which a model provides a prediction (e.g., a prediction that satisfies a minimum threshold of accuracy), etc. In some embodiments, optimizers retain state history of the iterative process and can either: a) stop when maximum allowable iterations are reached; or b) stop when 1) there is no improvement over N iterations, 2) there is improvement, but it is too little to justify continuing (e.g., the error improvement falls below a threshold), or 3) the error gets worse. Various other criteria may be implemented.

In response to determining the optimized model, model optimization module 240 stores the optimized model in association with the dataset. For example, system 200 stores a mapping of optimized models to dimensions of particular datasets. In some embodiments, model optimization module generates the composite model that comprises (or references or points to) the optimized models for each of the set of one or more models for a dataset.

In some embodiments, system 200 comprises model prediction module 245. System 200 uses model prediction module 245 to receive a query with respect to the dataset, such as a request for a prediction of a particular value. The query indicates one or more parameters for the requested prediction. Model prediction module 245 determines at least one model to invoke in connection with obtaining a response to the query. As an example, model prediction module 245 determines the at least one model based at least in part on one or more query parameters in the query such as a type of prediction (e.g., forecasted sales, etc.), a scope of the prediction (e.g., a geographic location, a particular store, a particular item or type of item, a particular department, a particular brand, etc.), a temporal bounding condition (e.g., a future date-time, or range thereof such as a particular number of days, weeks, months, or years from the present day), etc. In some embodiments, the at least one model is comprised in (or pointed to or invoked by) the composite model for the dataset. In some embodiments, in response to determining the at least one model, model prediction module 245 invokes the at least one model to obtain a prediction that is responsive to the query. In response to obtaining the prediction, model prediction module 245 provides the prediction to a user or other system for which the result is to be returned. For example, model prediction module 245 provides the prediction to user interface module 250 for display to the user.

In some embodiments, system 200 comprises user interface module 250. System 200 uses user interface module 250 to provide a user interface via which a user discovers and/or accesses one or more files stored in a dataset, to set one or more policies or thresholds with respect to training models, allocating resources for building models, etc. As an example, the user interface is a web interface that is provided as a web service such as on a page accessed by a user.

According to various embodiments, storage 215 comprises one or more of filesystem data 260, dataset data 265, and/or model data 270. Storage 215 comprises a shared storage (e.g., a network storage system) and/or database data, and/or user activity data. Filesystem data 260 comprises data such as a data generated in connection with analyzing datasets (e.g., for the associated keys or dimensions along which models are to be trained), data generated in connection with building models, historical information pertaining to models or datasets, one or more policies or thresholds, etc. In some embodiments, dataset data 265 comprises information pertaining to locations of datasets stored in a data store, or information pertaining to models mapped to a dataset (e.g., an indication of models trained for a dataset) and/or metadata pertaining to the dataset. In some embodiments, model data 270 comprises information pertaining to one or more models, a mapping of models trained for a dataset to a composite model (or to a dataset), metadata associated with the models, parameters used in connection with training the particular models (e.g., the parameters for the optimized models), etc.

According to various embodiments, memory 220 comprises executing application data 275. Executing application data 275 comprises data obtained or used in connection with executing an application such as an application executing in connection with managing files stored on a dataset, managing datasets, managing models built for a dataset, managing updating models based on new/current data, etc. In some embodiments, the application comprises one or more applications that perform one or more of: receiving and/or executing a query or task, generating a report and/or configure information that is responsive to an executed query or task, and/or providing to a user, information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, a feature rating application, a feature analysis application, a feature development application, etc.).

Figure 3:
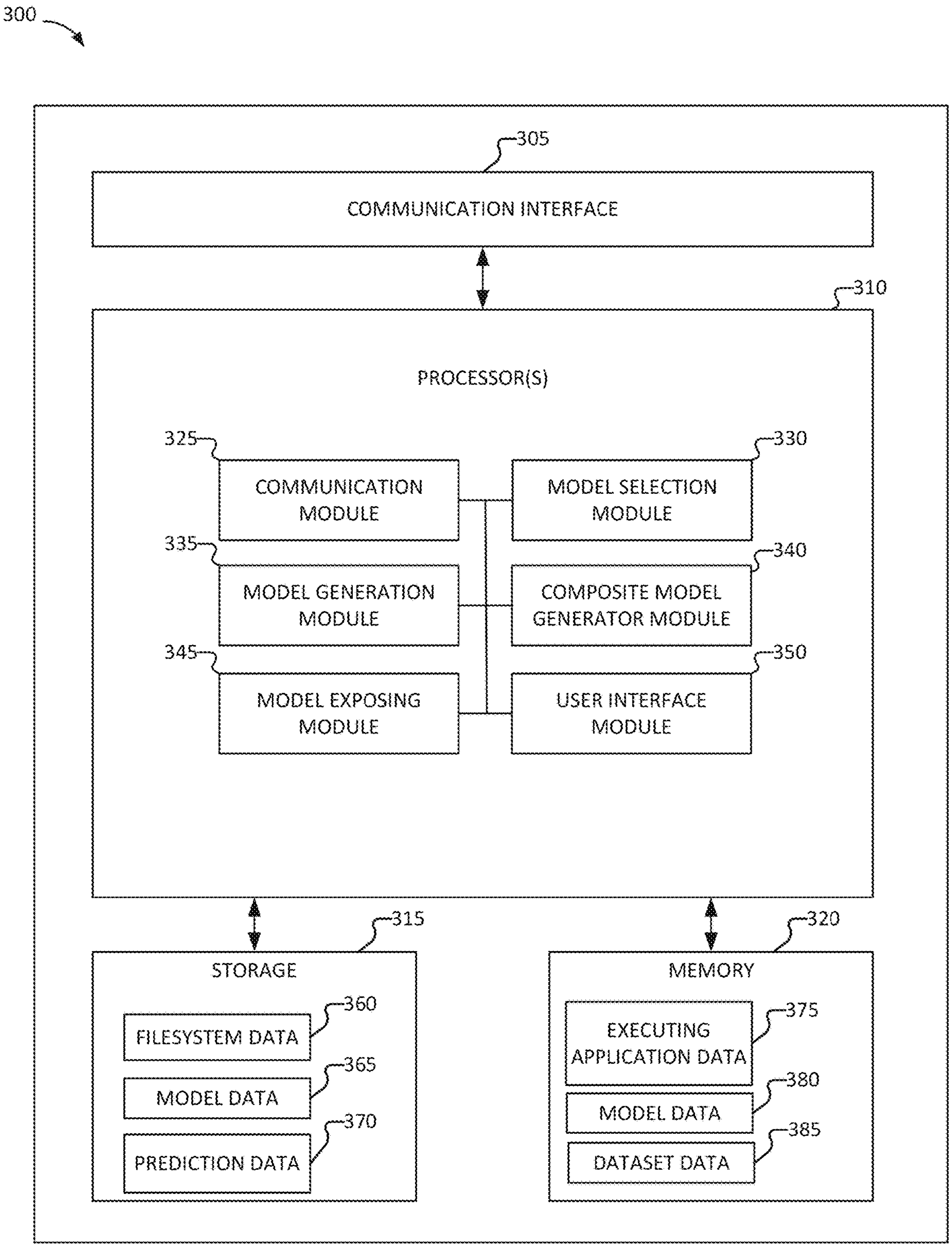
FIG. 3 is a block diagram of a model management service for building and deploying a model according to various embodiments of the present application.

FIG. 3 is a block diagram of a model management service for building and deploying a model according to various embodiments of the present application.

According to various embodiments, system 300 implements at least part of system 100 of FIG. 1. In some embodiments, system 300 is implemented in connection with system 200 of FIG. 2 and/or system 400 of FIG. 4. In some embodiments, system 300 is implemented in connection with process 700 of FIG. 7, process 800 of FIG. 8, process 900 of FIG. 9, and/or process 1000 of FIG. 10.

In the example shown, system 300 implements one or more modules in connection with determining to build a set of one or more models with respect to a dataset, building the set of one or more models, and/or exposing the set of one or more models (e.g., to a user or other system). In some embodiments, system 300 is implemented in connection with receiving a dataset such as a dataset provided (e.g., uploaded) by a user, other system, etc. System 300 comprises communication interface 305, one or more processors 310, storage 315, and/or memory 320. One or more processors 310 comprises one or more of communication module 325, model selection module 330, model generation module 335, composite model generator module 340, model exposing module 345, and/or user interface module 350.

In some embodiments, system 300 comprises communication module 325. System 300 uses communication module 325 to communicate with various other systems such as an application server, a data store, and/or client terminals or user systems such as a client system or an administrator system. According to various embodiments, communication module 325 corresponds to, or is similar to, communication module 225 of system 200 of FIG. 2.

In some embodiments, system 300 comprises model selection module 330. System 300 uses model selection module 330 to determine a set of models that are to be built for a dataset. In some embodiments, model selection module 330 determines the dimensions of the dataset along which models are to be generated. The dimensions may correspond to predictions for which models are to be built to service queries with respect to the dataset.

Model selection module 330 may determine the set of models to build based at least in part on a format or syntax of the dataset. For example, the dataset comprises a plurality of keys and corresponding values. In some embodiments, a particular key corresponds to a grouping of columns of the dataset. Model selection module 330 analyzes the dataset and extracts at least a subset of the plurality of keys. In response to determining the at least a subset of the plurality of keys, the system determines the set of models to be built with respect to the dataset. For example, the plurality of keys are indicative of the set of models to be built with respect to the dataset. Accordingly, as an example, a user uses a formatting of the database to instruct system 300 of the desired set of models to be built (or the predictions for which the system is to generate with respect to the dataset).

In some embodiments, system 300 comprises model generation module 335. System 300 uses model generation module 335 to build the set of models for a dataset. Model generation module 335 obtains a set of starting parameters, caches the corresponding dataset and the set of starting parameters, and uses the cached dataset and corresponding set of starting parameters to build the set of models for the dataset. In some embodiments, model generation module obtains information from fields (e.g., rows) of the dataset, stores the information in a table, and stores parameters for tuning or parameterizing the meta-grouped models (e.g., the set of one or more models to be built for a dataset). In connection with building the set of models for a dataset, model generation module 335 determines compute resources to deploy for training the models and allocates the compute resources to train the set of models in parallel. For example, each compute resource (e.g., each virtual machine, each thread, etc.) trains/optimizes a model for a particular dimension along the dataset, and the compute resources iterate in parallel to build the corresponding models for a dataset in parallel. In response to a compute resource iterating over parameters to determine a set of different versions of a model along a particular dimension of the dataset, model generation module 335 determines an optimized model from among the set of different versions of the model. In some embodiments, model generation module 335 selects the best version of the model based at least in part on one or more predetermined criteria. Examples of the one or more predetermined criteria include: a most accurate prediction, a best fit, an accuracy of a prediction that exceeds a predefined accuracy threshold in conjunction with a variability of an inaccuracy being below a predefined variability threshold, a speed by which a model provides a prediction (e.g., a prediction that satisfies a minimum threshold of accuracy), etc. Various other criteria may be implemented. In some embodiments, optimizers retain state history of the iterative process and can either: a) stop when maximum allowable iterations are reached; or b) stop when 1) there is no improvement over N iterations, 2) there is improvement, but it is too little to justify continuing (e.g., the error improvement falls below a threshold), or 3) the error gets worse.

In some embodiments, system 300 comprises composite model generator module 340. System 200 uses composite model generator module 340 to generate a composite model corresponding to a dataset. In response to determining the set of one or more models for a database (e.g., a set of optimized models), composite model generator module 340 generates a composite model for the dataset. According to various embodiments, the composite model exposes the set of one or more models in a unified model that is configured to service queries to any one of the set of one or more models for the dataset.

In some embodiments, composite model generator module 340 configures the composite model with an application programming interface (API). For examples, system 300 configures the composite model to enable a user (or another system) to submit a query with respect to the set of models in connection with obtaining a prediction for an attribute using a model generated (e.g., built, trained, etc.) based at least in part on the dataset. In some embodiments, a query is submitted via the interface exposing the composite model, and in response to such query, system 300 (e.g., a predictor module such as model prediction module 245 of system model, etc.) determines the applicable model (e.g., a model selected from among the set of models comprised in the composite model) to invoke (e.g., use) to provide the prediction, and invokes the applicable model to obtain the prediction.

In some embodiments, system 300 comprises model exposing module 345. System 300 uses model exposing module 345 to expose a model (e.g., the composite module) to a user or other system. As an example, model exposing module 345 configures an interface with which queries are submitted to a model. For example, the model exposing module 345 receives a query such as a request for a prediction with respect to a value for the dataset, parses the query, and invokes the applicable model to obtain a prediction.

In some embodiments, system 300 comprises user interface module 350. System 300 uses user interface module 350 to provide a user interface via which a user discovers and/or accesses one or more files stored in a dataset, to set one or more policies or thresholds with respect to training models, allocating resources for building models, etc. As an example, the user interface is a web interface that is provided as a web service such as on a page accessed by a user.

According to various embodiments, storage 315 comprises one or more of filesystem data 360, model data 365, and/or prediction data 370. Storage 315 comprises a shared storage (e.g., a network storage system) and/or database data, and/or user activity data. Filesystem data 360 comprises data such as datasets, data generated in connection with analyzing datasets (e.g., for the associated keys or dimensions along which models are to be trained), data generated in connection with building models, historical information pertaining to models or datasets, one or more policies or thresholds, etc. In some embodiments, model data 365 comprises information pertaining to one or more models, a mapping of models trained for a dataset to a composite model (or to a dataset), metadata associated with the models, parameters used in connection with training the particular models (e.g., the parameters for the optimized models), etc. In some embodiments, prediction data 370 comprises information pertaining to predictions obtained by invoking a model, such as in response to a query from a user or other system. Prediction data 370 comprises attributes or other metadata pertaining to predictions such as an accuracy, type of prediction, date/time on which the prediction is computed, etc.

According to various embodiments, memory 320 comprises executing application data 375. Executing application data 375 comprises data obtained or used in connection with executing an application such as an application executing in connection with managing files stored on a dataset, managing datasets, managing models built for a dataset, managing updating models based on new/current data, etc. In embodiments, the application comprises one or more applications that perform one or more of: receiving and/or executing a query or task, generating a report and/or configuring information that is responsive to an executed query or task, and/or providing to a user, information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, a feature rating application, a feature analysis application, a feature development application, etc.).

FIG. 4 is a block diagram of a model management service for tuning a deployed model according to various embodiments of the present application.

According to various embodiments, system 400 implements at least part of system 100 of FIG. 1. In some embodiments, system 400 is implemented in connection with system 200 of FIG. 2 and/or system 300 of FIG. 3. In some embodiments, system 400 is implemented in connection with process 700 of FIG. 7, process 800 of FIG. 8, process 900 of FIG. 9, and/or process 1000 of FIG. 10.

In the example shown, system 400 implements one or more modules in connection with updating a set of models for a dataset, and/or exposing the updated models (e.g., to a user or other system). In some embodiments, system 400 is implemented in connection with receiving a dataset such as a dataset provided (e.g., uploaded) by a user, other system, etc. System 400 comprises communication interface 405, one or more processors 410, storage 415, and/or memory 420. One or more processors 410 comprises one or more of communication module 425, tuning scheduler module 430, optimizer selection module 435, set of optimizers 440, model prediction module 445, and/or user interface module 450.

In some embodiments, system 400 comprises communication module 425. System 400 uses communication module 425 to communicate with various other systems such as an application server, a data store, and/or client terminals or user systems such as a client system or an administrator system. According to various embodiments, communication module 425 corresponds to, or is similar to, communication module 225 of system 200 of FIG. 2. In some embodiments, communication module 425 receives updated data corresponding to a dataset (e.g., a dataset that is used to train models). The updated data may correspond to an entire new dataset, or the system may receive new data periodically (e.g., contemporaneous with the new data being generated at the source such as a user's e-commerce system) and system 300 modifies the dataset to include the new data.

In some embodiments, system 400 comprises tuning scheduler module 430. System 400 uses tuning scheduler module 430 to determine when a set of models associated with a dataset is to be updated and/or to schedule the updating of the set of models. In some embodiments, tuning scheduler module 430 determines to update a set of models in response to determining that a drift has occurred with respect to the dataset used to train the set of models. As an example, tuning scheduler module 430 determines that drift has occurred if a difference between the dataset used to train a particular set of models and current data (e.g., a new/updated dataset) satisfies a threshold criteria (e.g., equals or exceeds a predetermined or preset drift threshold). As another example, tuning scheduler module 430 determines that drift has occurred if a change in accuracy of the set of models (e.g., an accuracy of the model with respect to the dataset used to train the model versus an accuracy of the model with respect to current data) satisfies a threshold criteria (e.g., equals or exceeds a predetermined or preset drift threshold). In some embodiments, tuning scheduler module 430 assesses the performance of the set of models and/or a change in the dataset according to a predetermined schedule and/or in response to receiving the updated/new data. In some embodiments, tuning scheduler module 430 determines to automatically update the set of models for a dataset according to a predetermined schedule.

In some embodiments, system 400 comprises optimizer selection module 435. System 400 uses optimizer selection module 435 to determine a set of optimizers (e.g., compute resources) to deploy in connection with updating a particular set of models. Optimizer selection module 435 manages allocation of the set of optimizers during the updating of the set of models. For example, optimizer selection module 435 allocates additional optimizers in connection with improving the speed by which the set of models is trained (e.g., in response to receiving a request from a user or other system to speed up the updating of the set of models).

In some embodiments, system 400 comprises set of optimizers 440. System 400 uses set of optimizers 440 to train the set of models for a dataset. In some embodiments, each of the optimizers trains/updates a model in isolation to another optimizer. Set of optimizers 440 respectively caches the dataset (e.g., the data to be used to update the particular model) and set of starting parameters, and set of optimizers 440 respectively trains/updates a particular model from the set of models for a dataset.

In some embodiments, tuning (e.g., updating) a particular model comprises caching the corresponding dataset for which a model is to be tuned (e.g., a current dataset), obtaining a set of starting parameters, and updating the model based at least in part on information comprised in the dataset (e.g., information pertaining to the dimension along which the model is being built) and/or the set of starting parameters. The caching of the corresponding dataset and the set of starting parameters comprises obtaining information from fields (e.g., rows) of the dataset, storing the information in a table, and storing parameters for tuning or parameterizing the meta-grouped models (e.g., the set of one or more models to be built for a dataset). An optimizer from set of optimizers 440 caches the model and optimizes the model based at least in part on running an iteration over various sets of parameters and selecting a best version of the set of model versions obtained by the corresponding iterations. In some embodiments, an optimizer building a particular model (e.g., determining an updated model) iterates over a set of combinations or permutations of parameters. The optimizer resource may implement a threshold maximum number of parameters and iterate over a set of combinations or permutations of different parameters constrained by threshold maximum number of parameters. In some embodiments, the set of parameters with which to tune a model is selected based at least in part on a set of parameters previously used to train/tune the model (e.g., using the initial dataset or in connection with a previous tuning of the model) and/or a set of parameters used to train/tune a different model (e.g., a similar model such as a model used to provide a same type of prediction, a model used for a similar organization such as models across two organizations in a same industry, etc.).

In some embodiments, system 400 comprises model prediction module 445. System 400 uses model prediction module 445 to receive a query with respect to the dataset, such as a request for a prediction of a particular value. According to various embodiments, model prediction module 445 corresponds to, or is similar to, model prediction module 245 of system 200 of FIG. 2.

In some embodiments, system 400 comprises user interface module 450. System 400 uses user interface module 450 to provide a user interface via which a user discovers and/or accesses one or more files stored in a dataset, to set one or more policies or thresholds with respect to training models, allocating resources for building models, etc. As an example, the user interface is a web interface that is provided as a web service such as on a page accessed by a user. According to various embodiments, user interface module 450 corresponds to, or is similar to, user interface module 250 of system 200 of FIG. 2.

According to various embodiments, storage 415 comprises one or more of filesystem data 460, model data 465, and/or prediction data 470. Storage 415 comprises a shared storage (e.g., a network storage system) and/or database data, and/or user activity data. Filesystem data 460 comprises data such as datasets, data generated in connection with analyzing datasets (e.g., for the associated keys or dimensions along which models are to be trained), data generated in connection with building models, historical information pertaining to models or datasets, one or more policies or thresholds, etc. In some embodiments, model data 465 comprises information pertaining to one or more models, a mapping of models trained for a dataset to a composite model (or to a dataset), metadata associated with the models, parameters used in connection with training the particular models (e.g., the parameters for the optimized models), etc. In some embodiments, prediction data 470 comprises information pertaining to predictions obtained by invoking a model, such as in response to a query from a user or other system. Prediction data 470 comprises attributes or other metadata pertaining to predictions such as an accuracy, type of prediction, date/time on which the prediction is computed, etc.

According to various embodiments, memory 420 comprises executing application data 475. Executing application data 475 comprises data obtained or used in connection with executing an application such as an application executing in connection with managing files stored on a dataset, managing datasets, managing models built for a dataset, managing updating models based on new/current data, etc. In embodiments, the application comprises one or more applications that perform one or more of receive and/or execute a query or task, generate a report and/or configure information that is responsive to an executed query or task, and/or to provide to a user information that is responsive to a query or task.

Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, a feature rating application, a feature analysis application, a feature development application, etc.).

FIG. 5A is a diagram of a dataset used in connection with deploying a model according to various embodiments of the present application.

According to various embodiments, the system receives a dataset comprising one or many groupings of keys. The keys may serve to define the grouped structure of the dataset. In the example illustrated, dataset 500 is configured to include data pertaining to airline passengers at different airports.

As illustrated in FIG. 5A, dataset 500 comprises two distinct time series groups: JFK airport and LaGuardia airport. In order to isolate these time series elements so that the time series can be modeled independently of one another, the system applies transformation logic that constructs isolable data structures that can be submitted through a queued processing system (either shared memory or isolated memory).

FIG. 5B is a diagram of a dataset used in connection with a model according to various embodiments of the present application.

As illustrated in FIG. 5B, process 525 transforms dataset 500 in connection with determining dimensions of the dataset such as a set of dimensions along which models are to be built for dataset 500. According to various embodiments, in response to receiving dataset 500, the system analyzes dataset 500 and obtains the set of dimensions along which models are to be built. For example, the system applies transformation logic. As illustrated in process 525, the system determines that dataset 500 comprises key1 and key2, and the system determines groupings of key-values (e.g., the combinations/permutations of the various values across key1 and key2. For example, the system determines that the groupings (e.g. the set of dimensions) is (key1, key2)=(US, CA); (key1, key2)=(US, WA); (key1, key2)=(CA, ON). In some embodiments, key2 is not indicated as an important key and then the data is automatically summed to collapse key2 leaving US and CA data either fully collapsed (e.g., US and CA) or partially collapsed (e.g., US, CA collapsed, US, WA collapsed, CA, ON collapsed).

Figure 5C:
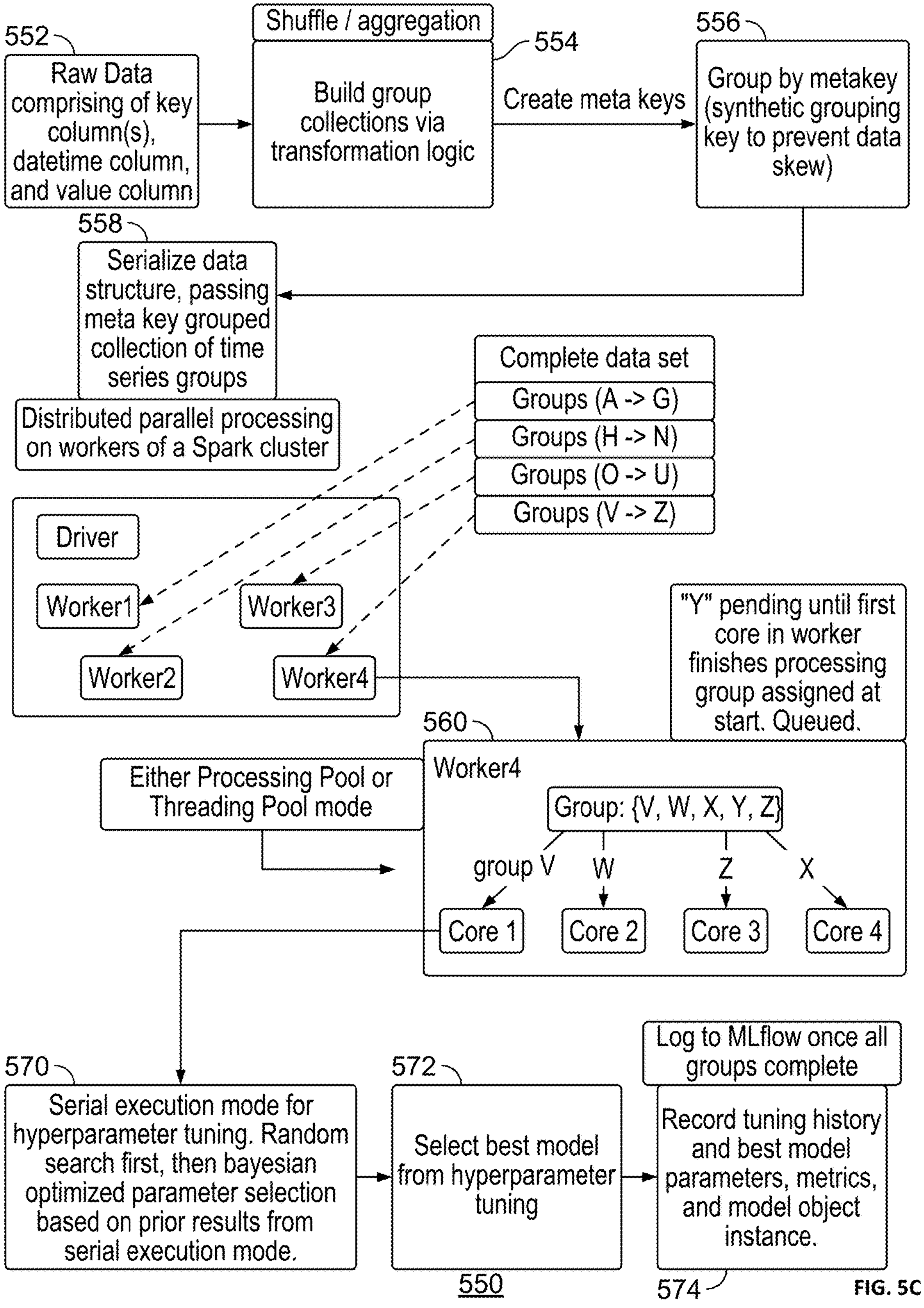
FIG. 5C is a diagram of using a dataset in connection with generating one or more models according to various embodiments of the present application.

FIG. 5C is a diagram of using a dataset in connection with generating one or more models according to various embodiments of the present application.

As illustrated in FIG. 5C, process 550 receives raw data and determines a set of models based at least in part on extracting keys from the raw data, and the values for different key groupings.

At 552, raw data comprising key column(s), a date/time column, and a value column is received. For example, the system receives dataset 500 comprising the columns for country, airport, date, and passengers, and the country and airport columns may respectively correspond to keys for the dataset. In response to receiving the dataset, at 552, the system analyzes the dataset and builds group collections of data. For example, the system applies transformational logic to determine a set of dimensions of the dataset along which models are to be built. In response to obtaining the grouping of data, at 556, the system determines a set of keys for the dataset based at least in part on the group collections data.

At 558, in response to obtaining the keys for the dataset, the system processes the dataset such as to serialize the data structure based at least in part on the keys.

As illustrated in FIG. 5C, the groupings (e.g., the groupings of keys, the dimensions of datasets) are allocated to different compute resources. For example, groups A to G are allocated/assigned to first worker node (e.g., worker 1) of a cluster; groups H to N are allocated/assigned to second worker node (e.g., worker 2) of a cluster; groups O to U are allocated/assigned to third worker node (e.g., worker 3) of a cluster; and groups V to Z are allocated/assigned to fourth worker node (e.g., worker 4) of a cluster. In some embodiments, the first worker node, second worker node, third worker node, and fourth worker node operate in parallel to train (e.g., build) models for the corresponding groups allocated thereto.

For example, the fourth worker node 560 (e.g., worker 4) comprises four cores (e.g., core 1, core 2, core 3, and core 4) that are respectively assigned a different grouping (e.g., a different dimension of the dataset, key-value groupings, etc.). The training process implemented by the cores (e.g., core 1) is illustrated at 570 to 574. At 580, the core (e.g., a compute resource) trains a set of versions for the model for providing predictions with respect to the corresponding dimension. As an example, the core obtains a set of starting parameters, and iterates through parameters to obtain respective versions of the model. As another example, the core performs a Bayesian optimized parameter selection based on a prior result from training the model in connection with determining parameters to be used for training the different versions of the model. At 572, a best model (e.g., the optimized model) is selected from among the set of versions of a model for a particular dimension. At 574, the system (e.g., the core) stores a tuning history and a set of parameters used for the best model, metrics pertaining to the model, and a model object instance. The system may store various other metadata associated with the model or other versions of the model along the particular dimension.

Figure 5D:
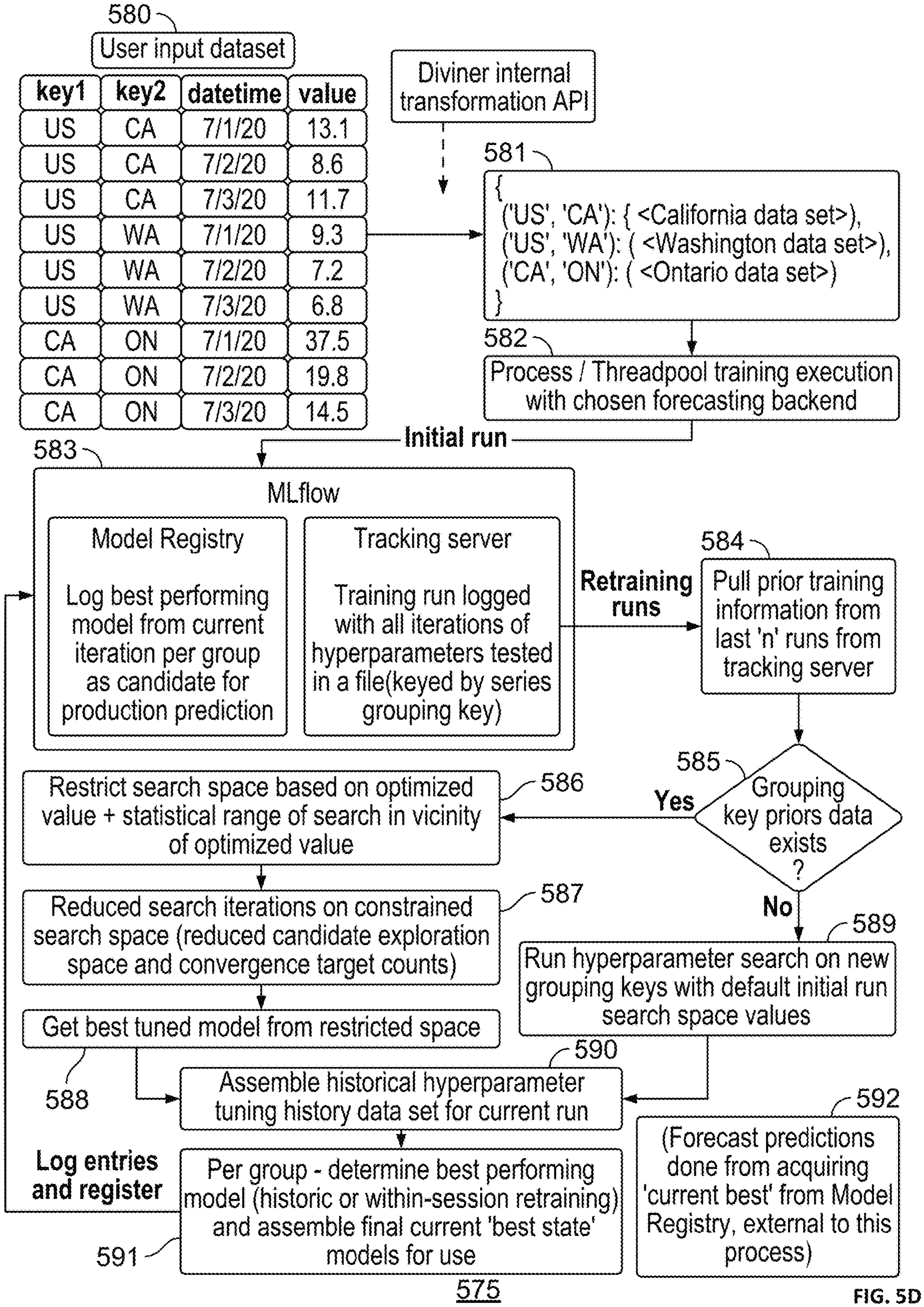
FIG. 5D is a diagram of using a dataset in connection with generating one or more models according to various embodiments of the present application.

FIG. 5D is a diagram of using a dataset in connection with generating one or more models according to various embodiments of the present application. As illustrated in FIG. 5D, process 575 receives a dataset, analyzes the dataset, and generates a set of models corresponding to dimensions of the dataset.

At 580, a dataset is received. In some embodiments, the dataset is received via an interface exposed to a user or other system. As illustrated in FIG. 5D, the dataset comprises columns corresponding to country, state/province, date/time, and values. The column for country corresponds to a first key (e.g., key1), and the column for state/province corresponds to a second key (e.g., key2).

At 581, the set of models to build for the dataset is determined. In some embodiments, the system analyzes/processes the dataset and determines a set of dimensions corresponding to the dataset. In response to determining the set of dimensions corresponding to a dataset, the system determines to build models corresponding to each of the set of dimensions. For example, the set of dimensions corresponds to a grouping of key-values. Using the received dataset, the system determines the groupings to be (key1, key2)=(US, CA); (key1, key2)=(US, WA); and (key1, key2)= (CA, ON).

At 582, a plan for building the set of models for a dataset is determined. For example, the set of models are planned to be built by processing using threadpool training execution with chosen forecasting backend. In some embodiments, the system determines a set of compute resources (e.g., optimizers) used to build the set of models for a dataset and allocates the training of the set of models to the set of compute resources.

At 583, a machine learning process is instructed to build the set of models. In some embodiments, the set of compute resources iterates over the set of models to train the set of models for the dataset. The set of compute resources work in parallel with one another to iterate over the respective model(s) assigned to the various compute resources. According to various embodiments, within the iteration over the set of models, for each model being trained the corresponding compute resource iterates over a set of parameters to obtain a set of versions of the particular model. In response to determining the set of versions of the particular model, the system assesses the set of versions of the particular model and selects a best version of the model (e.g., the optimized model). The system stores information pertaining to at least the optimized model, such as the model as an object, performance metrics/characteristics associated with the model (e.g., an accuracy of a prediction obtained from the model), a set of parameters associated with training the optimized model, etc. In some embodiments, the system stores the dataset used in connection with training the optimized model (e.g., the dataset may be used to detect drift with respect to current data). In some embodiments, a model registry logs a best performing model from current iteration per group as a candidate for production prediction and a tracking server logs the training runs with all iterations of hyperparameters testing in a file (e.g., as keyed by series of grouping keys).

In some embodiments, the system stores information pertaining to one or more other versions of a model for a particular dimension of the model. For example, the system stores information pertaining to versions of the model that are not selected as the optimized model. Examples of the information pertaining to the versions of the model include the model as an object, performance metrics/characteristics associated with the model (e.g., an accuracy of a prediction obtained from the model), a set of parameters associated with training the optimized model, etc.

In response to a determination that a model for a dataset is to be updated, process 575 proceeds to 584. As an example, the system determines to update a model in response to a detection of drift of the underlying dataset from which the model was last trained. As another example, the system determines to update the model in response to a determination that a predetermined time period has lapsed since the model was last trained.

At 584, historical information pertaining to the training of model(s) is obtained. For example, the system obtains the information stored with respect to the set of versions of the model that was stored in connection with the training of the versions of the model (e.g., the parameters used to train the respective versions, the performance characteristics, etc.). As another example, the system obtains information stored with respect to models for a different dataset but that are used to train the same type of model (e.g., a model that provides the same type of prediction, a model that is trained using a similar dataset such as a dataset having keys or type of information that satisfies a predefined similarity threshold, etc.).

At 585, the system determines whether the historical information comprises information pertaining to the training of model(s) (or versions thereof) along the same dimension of the model being updated. For example, the system determines whether the historical information comprises a grouping of keys that matches the corresponding grouping of keys for the model being updated.

In response to determining that the historical information comprises information pertaining to the training of model(s) (or versions thereof) along the same dimension of the model being updated at 585, process 575 proceeds to 586 at which a search for the set of parameters (e.g., to be used in connection with training the model) is restricted based at least in part on a set of parameters previously used in training the model (or other versions of the model, etc.). For example, the system defines a search space to perform a search for parameters to use in training (e.g., updating) the model. In some embodiments, the definition of the search space of possible parameters comprises restricting the search space based at least in part on the set of parameters previously used to train the optimized model. In some embodiments, the system determines a set of boundaries for the search space based at least in part on the set of parameters used to previously train the optimized model and one or more statistical thresholds. For example, the system determines to restrict a set of possible parameters to those parameters within a predetermined statistical threshold of the set of parameters used to previously train the optimized model.

At 587, the system updates (e.g., trains) the model based at least in part on the search space. In some embodiments, the system iterates over possible sets of parameters within the search space to obtain a set of versions of an updated model. In connection with training a model (e.g., training an updated model for a particular dimension), the system reduces a number of iterations based on reducing the number of possible sets of parameters with which the model is to be trained. For example, the system constrains the set of parameters used for training the model to the restricted set of possible parameters (e.g., those parameters within a predetermined statistical threshold of the set of parameters used to previously train the optimized model, as determined at 586).

At 588, an optimized model is selected. In some embodiments, the system selects the optimized model (e.g., a best updated model) from among the versions of the updated model corresponding to a particular dimension of the dataset. In some embodiments, the best version of the model is selected based at least in part on one or more predetermined criteria. Examples of the one or more predetermined criteria include: a most accurate prediction, a best fit, an accuracy of a prediction that exceeds a predefined accuracy threshold in conjunction with a variability of an inaccuracy being below a predefined variability threshold, a speed by which a model provides a prediction (e.g., a prediction that satisfies a minimum threshold of accuracy), etc. In some embodiments, optimizers retain state history of the iterative process and can either: a) stop when maximum allowable iterations are reached; or b) stop when 1) there is no improvement over N iterations, 2) there is improvement, but it is too little to justify continuing (e.g., the error improvement falls below a threshold), or 3) the error gets worse. Various other criteria may be implemented.

In response to determining that the historical information does not comprise information pertaining to the training of model(s) (or versions thereof) along the same dimension of the model being updated at 585, process 575 proceeds to 589 at which the system iterates the training of the model (e.g., versions of the updated model) using a set of parameters selected in accordance with a default parameter criterion. In some embodiments, for libraries that have self-contained autonomous tuning, default ranges for search space exploration are provided (and are able to be overridden through the system). In some embodiments, the optimizer selects values between these minimum and maximum ranges (for numeric values) or randomly select categorical values from finite lists of available values. In some embodiments, these default search ranges can also be overridden by a user (or, in the case of passive retraining, these search range values are automatically retrieved from past optimization runs to set a reasonable range in which to search in subsequent automated optimization training runs).

At 590, the system obtains information pertaining to the optimized model. Examples of information stored with respect to the optimized model includes performance metrics/characteristics associated with the model (e.g., an accuracy of a prediction obtained from the model), a set of parameters associated with training the optimized model, etc. In some embodiments, the system stores the dataset used in connection with training the optimized model (e.g., the dataset may be used to detect drift with respect to current data). In some embodiments, historical hyperparameter tuning history data set is assembled for the current run.

In some embodiments, the system stores information pertaining to one or more other versions of a model for a particular dimension of the model. For example, the system stores information pertaining to versions of the model that are not selected as the optimized model. Examples of the information pertaining to the versions of the model include model as an object, performance metrics/characteristics associated with the model (e.g., an accuracy of a prediction obtained from the model), a set of parameters associated with training the optimized model, etc.

At 591, the system stores the information pertaining to the optimized model along a particular dimension and/or other versions of the model along the particular dimension. In some embodiments, the system stores the information pertaining to the optimized model along each of the different dimensions of the dataset for which models are trained. As an example, the information pertaining to the optimized model along a particular dimension and/or other versions of such a model may be used as historical information for training future updates to the model or with similar models for other datasets (e.g., models that are for providing the same or similar type of predictions), etc. In some embodiments, a best performing model is determined per group and a final current best state model is assembled for use. In some embodiments, the best state models are logged and registered in a model register and tracking server.

At 592, a prediction is provided using a corresponding optimized model. In response to the system receiving a query, the system uses the query to determine one or more particular models (e.g., particular optimized model) to be used (e.g., invoked) in connection with providing a response to the query. For example, the system determines an optimized model corresponding to a prediction requested via the query and the system invokes the optimized model to obtain the prediction.

FIG. 6A is a diagram of a dataset used in connection with a model according to various embodiments of the present application.

According to various embodiments, the system receives a dataset comprising one or many groupings of keys. The keys may serve to define the grouped structure of the dataset. In the example illustrated, dataset 600 is configured to include data pertaining to airline passengers at different airports.

As illustrated in FIG. 6A, dataset 600 comprises two distinct time series groups: a group corresponding to key a0, and a group corresponding to key v3. Each of the time series groups also have a corresponding value (e.g., as illustrated in the column labeled 'y'). In order to isolate these time series elements so that the time series can be modeled independently of one another, the system applies transformation logic that constructs isolable data structures that can be submitted through a queued processing system (either shared memory or isolated memory).

FIG. 6B is a diagram of one or more characteristics associated with a set of models according to various embodiments of the present application.

In response to determining optimized models along the dimensions of the dataset, the system stores information pertaining to the optimized models. For example, as illustrated in FIG. 6B, information pertaining to the performance of the various optimized models (e.g., models respectively corresponding to keys/dimensions a0, a1, a2, a3, b0 . . . y1, y2, z0, z1, and z2) is stored. Examples of information pertaining to the performance of the various optimized models include performance metrics/characteristics such as mean squared error, root mean square error, mean absolute error, mean absolute percentage error, median absolute percentage error, symmetric mean absolute percentage error, coverage probability, etc.

Figure 7:
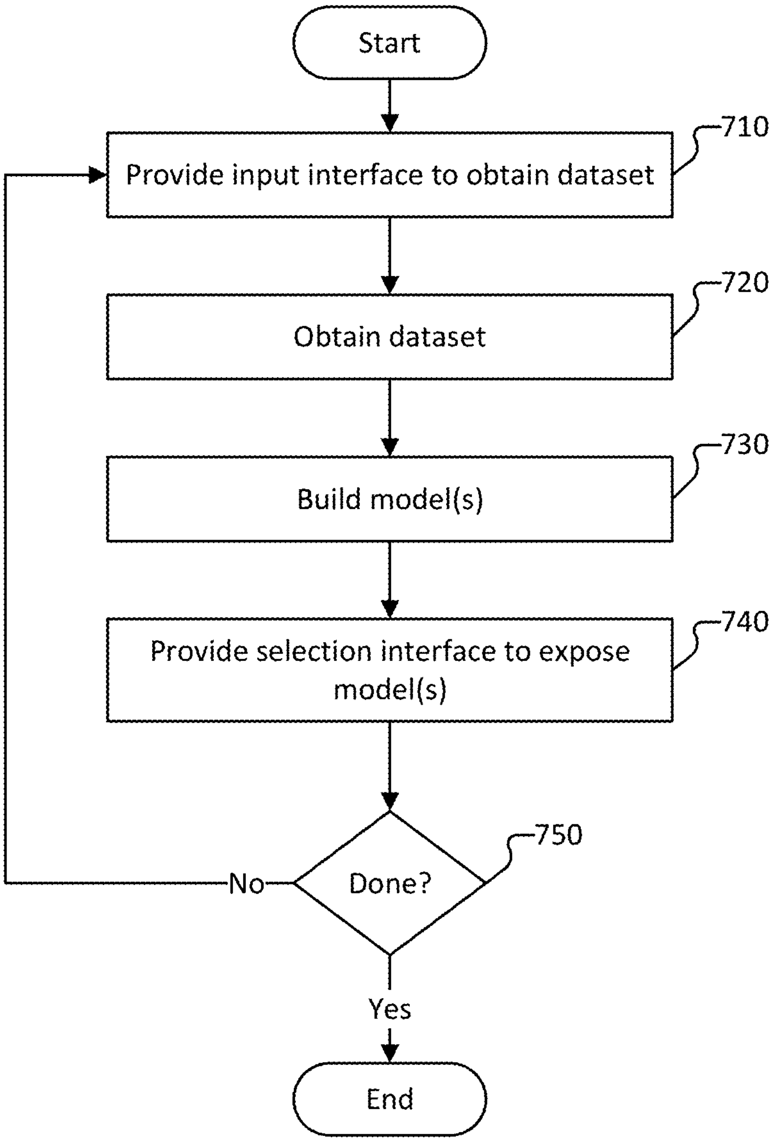
FIG. 7 is a flow diagram of a method for providing a set of interfaces in connection with deployment of a model according to various embodiments of the present application.

FIG. 7 is a flow diagram of a method for providing a set of interfaces in connection with deployment of a model according to various embodiments of the present application. In some embodiments, process 700 is implemented at least in part by system 100 of FIG. 1 (e.g., model management service 110), and/or system 200 of FIG. 2. In some embodiments, process 700 is implemented in connection with process 800 of FIG. 8, process 900 of FIG. 9, and/or process 1000 of FIG. 10.

At 710, an input interface is provided to obtain a dataset. In some embodiments, the system configures and provides a user interface via which a user uploads datasets or interfaces with datasets or models stored at the system. As an example, the user interface is provided in an application running on a client system. As another example, the user interface is provided in a web interface via which a user interfaces using a web browser running on the client system. In some embodiments, the system provides an API via which another system can upload datasets or otherwise interface with datasets or models stored at the system (e.g., the other system can use the API to request/run queries with respect to the datasets or models stored at the model management system).

At 720, the dataset is received. In some embodiments, the system receives the dataset via the input interface. For example, a user uploads the dataset in connection with a request for the system to build and/or manage models associated with the dataset.

At 730, model(s) is/are built. In some embodiments, in response to receiving the dataset the system automatically determines to build the model(s) with respect to the dataset. For example, the system determines the set of one or more models to build based at least in part on the dataset, such as a format of the dataset. According to various embodiments, building the model corresponds to invoking process 550 of FIG. 5C and/or process 800 of FIG. 8.

At 740, a selection interface is provided to expose the models(s). In some embodiments, the system provides an interface via which the set of models is exposed to a user or another system (e.g., a customer system). In some embodiments, the set of models associated with the dataset is exposed as a single or composite model. As an example, the composite model is exposed via an application programming interface (API). As another example, the composite model is exposed via a web interface. In some implementations, the composite model is wrapped in an API and the API is exposed to a model that configures the web interface.

According to various embodiments, in connection with exposing the selection interface, a user (or another system) can input (e.g., to the selection interface) a selection for a set of models and/or submit a query with respect to the set of models in connection with obtaining a prediction for an attribute using a model generated (e.g., built, trained, etc.) based at least in part on the dataset. In response to receiving the query, the system determines the applicable model (e.g., a model selected from among the set of models comprised in the composite model) to invoke (e.g., use) in order to provide the prediction and invokes the applicable model to obtain the prediction. The system determines the applicable model based at least in part on one or more parameters of the received query, such as boundary conditions of the prediction, an attribute for which a predicted value is being requested, etc.

At 750, a determination is made as to whether process 700 is complete. In some embodiments, process 700 is determined to be complete in response to a determination that no further datasets are uploaded, a query received with respect to a model is serviced, a user has exited the system, an administrator indicates that process 700 is to be paused or stopped, etc. In response to a determination that process 700 is complete, process 700 ends. In response to a determination that process 700 is not complete, process 700 returns to 710.

Figure 8:
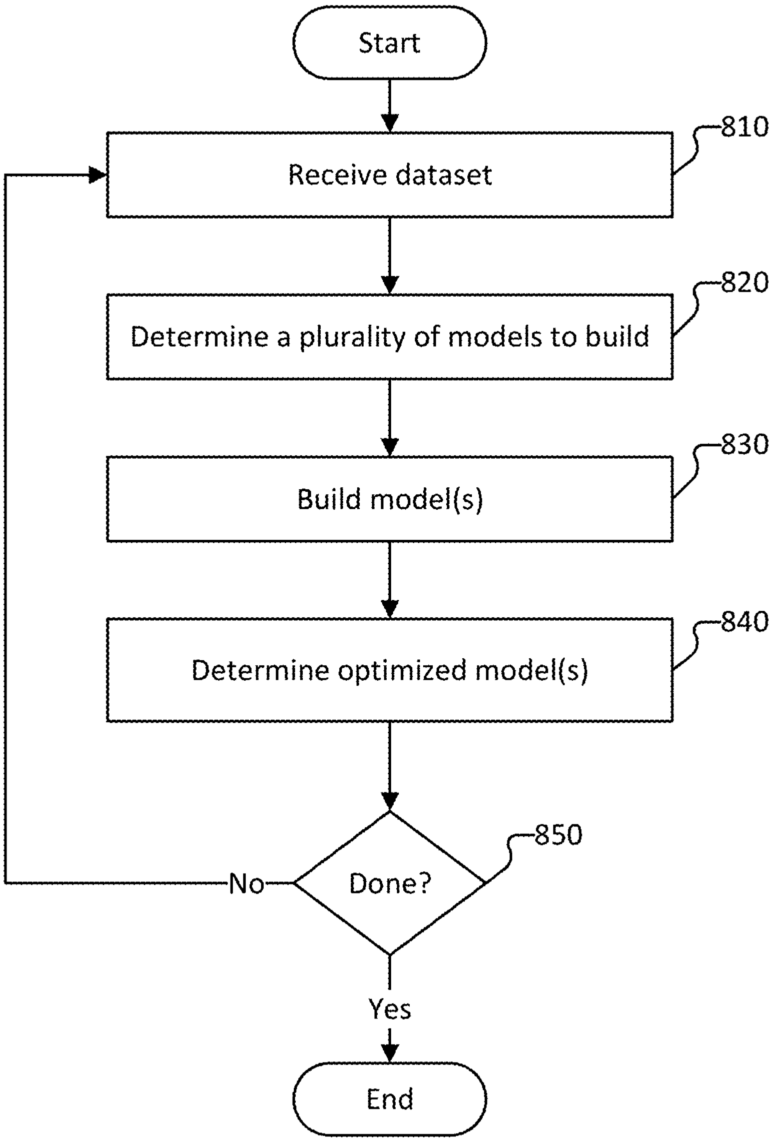
FIG. 8 is a flow diagram of a method for building a model using a receive dataset according to various embodiments of the present application.

FIG. 8 is a flow diagram of a method for building a model using a received dataset according to various embodiments of the present application. In some embodiments, process 800 is implemented at least in part by system 100 of FIG. 1 (e.g., model management service 110), and/or system 200 of FIG. 2. In some embodiments, process 800 is implemented in connection with process 700 of FIG. 7, process 900 of FIG. 9, and/or process 1000 of FIG. 10.

At 810, a dataset is received. According to various embodiments, the receiving the dataset corresponds to, or is similar to 720 of process 700 of FIG. 7. For example, the system receives the dataset from a user or other system via an input interface.

At 820, a plurality of models to build are determined. In some embodiments, in response to receiving the dataset, the system determines a plurality of models to build with respect to the dataset. According to various embodiments, the system determines the set of models to build based at least in part on a format or syntax of the dataset. For example, the dataset comprises a plurality of keys and corresponding values. The plurality of keys may correspond to a plurality of columns of the dataset. In some embodiments, a particular key corresponds to a grouping of columns of the dataset. In some embodiments, in response to receiving the dataset, the system analyzes the dataset and extracts at least a subset of the plurality of keys. In response to determining the plurality of keys, the system determines the set of models to be built with respect to the dataset. For example, the plurality of keys are indicative of the set of models to be built with respect to the dataset. Accordingly, as an example, a user may instruct the system of the desired set of models to be built (or the predictions for which the system is to generate with respect to the dataset). The user may upload the dataset via the interface, and in response to receiving the dataset, the system may automatically build (e.g., train) the set of models.

In some embodiments, a control paradigm is defined that utilizes the format of a dataset and the components of its columns to determine, define, and generate discrete user-controlled distinct temporal series. This structure (e.g., with narrow and long normalized data) permits the system to efficiently group the data comprising a particular user-defined series aggregation set in a distributed system, minimizing the volume of data shuffle transfer from one machine to another since the boundary condition for partitioned files can be 'cut' at boundaries that do not have data replication amongst multiple unrelated series. This also permits a user to define varying levels of aggregation without having to transform (e.g., to aggregate, to manipulate, etc.) the data prior to sending it to an API. The user can define the columns in the data set to be utilized for setting a hierarchical association by the inclusion or exclusion of columns that define uniqueness: the system processing will automatically group to the configured level and perform the appropriate data aggregation to render forecast modeling possible.

According to various embodiments, the dataset is uploaded as a single data entity. The dataset comprises a multi-keyed, key-value relationship. For example, the dataset comprises a plurality of columns, and at least a subset of the columns correspond to a key, and values comprised in a column including a key-value corresponding to the column key. Each field (or a subset of fields) may correspond to keys for the dataset. As an example, each key-value relationship may correspond to a different dimension of the dataset along which a model is to be built. For example, if a dataset corresponds to sales of different items, and a field of the dataset is a city filed, and the dataset comprises values of New York, Chicago, Los Angeles as values for the city field, a key for the dataset is the city and the key-value relationships (or pairs) are city=New York, city=Chicago, and city=Los Angeles. The system can then determine to build a set of models that correspondingly predict sales in New York, Chicago, or Los Angeles. According to various embodiments, the dataset is formatted based at least in part on a set of models that are to be determined (e.g., built) for the dataset. For example, a user (e.g., a user for a customer organization) may determine the models to be built (or predictions that the user desires to obtain using the dataset), and formats the dataset accordingly before uploading to the system. In some embodiments, the format of the dataset defines a granularity of models to be built using the dataset.

At 830, the model(s) is/are built. According to various embodiments, in response to determining the plurality of models to build based at least in part on the dataset (e.g., in response to determining dimensions of the dataset along which models are to be built), the system builds the plurality of models. In some embodiments, the system builds the plurality of models based on a batch process. For example, at least a subset of the plurality of models may be determined in parallel with each other.

In some embodiments, the system determines a set of compute resources (e.g., threads, compute nodes, processor cores, etc.) to allocate to the building of the plurality of models (or subsets thereof). As an example, the system determines a set of compute resources available for building models. In response to determining the set of compute resources available for building models, the system uses at least a subset of compute resources available to build the set of one or more models. As an example, the system allocates as many resources as possible from among the set of compute resources available to build subsets of the plurality of models in parallel with each other. The set of compute resources available for building models may be defined by one or more boundary conditions, including any one or more of a predetermined number of compute resources for building models, a predetermined percentage of system compute resources, a remaining set of compute resources after taking into account allocations of resources for other system processes, etc.

In response to determining the compute resources to allocate in order to build the plurality of models, the system assigns a respective one of the plurality of models to each compute resources (e.g., the compute resources selected to build the models), and the compute resources build the models. In some embodiments, the compute resources working in parallel respectively build different models at a particular time. As an example, the different models across the set of compute resources working in parallel have no dependence because the models and corresponding datasets are isolated.

In some embodiments, the building of a model by compute resources includes caching the corresponding dataset for which a model is to be built, obtaining a set of starting parameters, and training the model based at least in part on information comprised in the dataset (e.g., information pertaining to the dimension along which the model is being built) and/or the set of starting parameters. In some embodiments, the caching of the corresponding dataset and the set of starting parameters comprises obtaining information from fields (e.g., rows) of the dataset, storing the information in a table, and storing parameters for tuning or parameterizing the meta-grouped models (e.g., the set of one or more models to be built for a dataset). The compute resource caches the model and optimizes the model based at least in part on running an iteration over various sets of parameters and selecting a best version of the set of model versions obtained by the corresponding iterations. In some embodiments, a compute resource building a particular model iterates over a set of combinations or permutations of parameters. The compute resource may implement a threshold maximum number of parameters and iterate over a set of combinations or permutations of different parameters constrained by threshold maximum number of parameters. For example, the system may use a maximum of 15 parameters for building a model. Constraining the training/building the model based at least in part on threshold maximum number of parameters speeds up an optimization or deployment of models and/or predictions.

At 840, optimized model(s) are determined. In response embodiments, in response to the system iterating over combinations/permutations of parameters to determine a set of versions of a model for each of the plurality of models (e.g., for each dimension of the dataset for which a model is to be determined), the system selects a set of optimized models. According to various embodiments, the set of optimized models comprises a model for each dimension of the dataset for which a model is to be determined (e.g., for each grouping of key-values).

In some embodiments, the best version of the model (e.g., the optimized model) is selected based at least in part on one or more predetermined criteria (e.g., a best value of an optimization metric for each model of the plurality of models being determined and selecting, for example, for a best set of parameters for a given model). Examples of the one or more predetermined criteria include: a most accurate prediction, a best fit (e.g., as measured using an optimization metric), an accuracy of a prediction that exceeds a predefined accuracy threshold in conjunction with a variability of an inaccuracy being below a predefined variability threshold, a speed by which a model provides a prediction (e.g., a prediction that satisfies a minimum threshold of accuracy), etc. Various other criteria may be implemented.

At 850, a determination is made as to whether process 800 is complete. In some embodiments, process 800 is determined to be complete in response to a determination that no further datasets are uploaded, no further datasets for which models to be built exist, an administrator indicates that process 800 is to be paused or stopped, etc. In response to a determination that process 800 is complete, process 800 ends. In response to a determination that process 800 is not complete, process 800 returns to 810.

Figure 9:
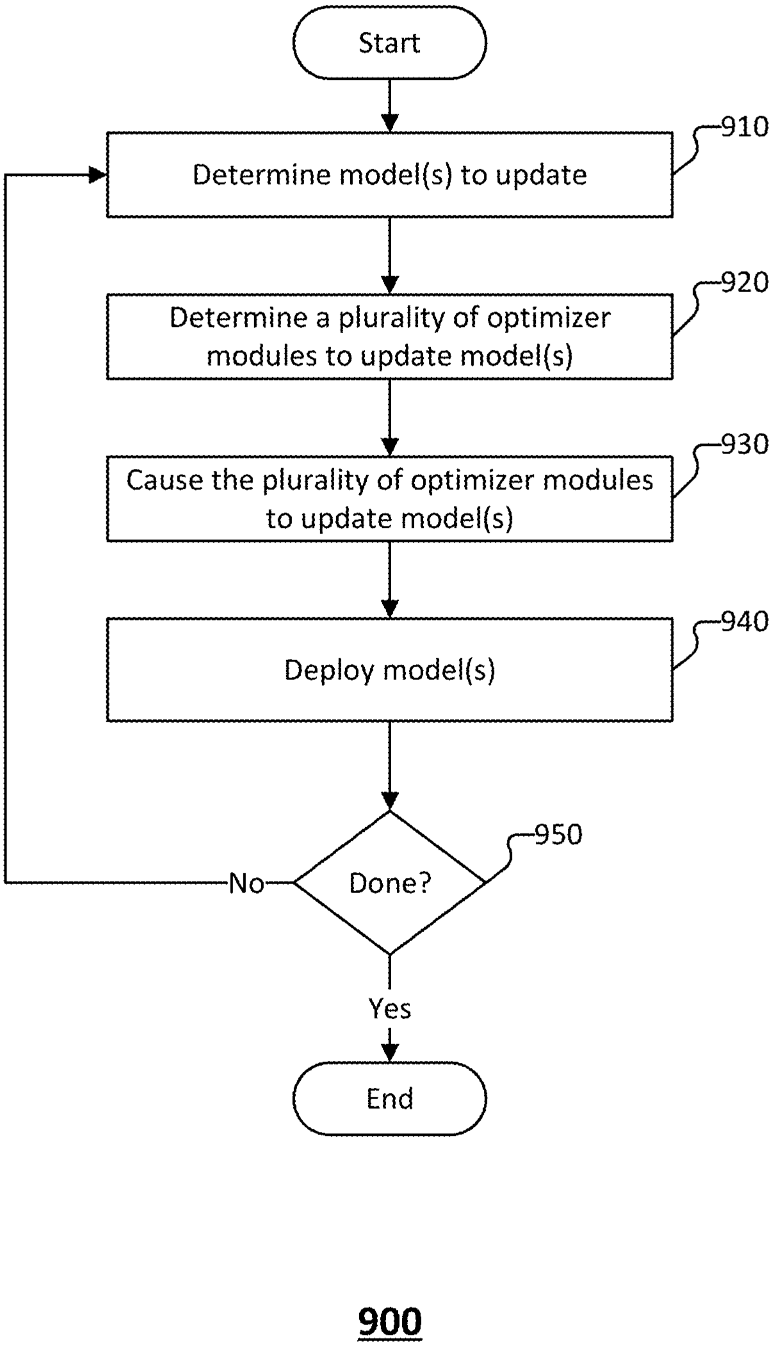
FIG. 9 is a flow diagram of a method for automatically tuning a set of models according to various embodiments of the present application.

FIG. 9 is a flow diagram of a method for automatically tuning a set of models according to various embodiments of the present application. In some embodiments, process 900 is implemented at least in part by system 100 of FIG. 1 (e.g., model management service 110), and/or system 200 of FIG. 2. In some embodiments, process 900 is implemented in connection with process 700 of FIG. 7, process 800 of FIG. 8, and/or process 1000 of FIG. 10.

At 910, model(s) to update is/are determined. In some embodiments, the system determines to update a set of one or more models based at least in part on an updated dataset or updated information for the dataset.

According to various embodiments, the system determines to update the set of one or more models in response to receiving the updated dataset (or updated information for the dataset). For example, in response to receiving the updated dataset, the system determines whether the current data (e.g., the updated data and/or the updated information for the dataset) has drifted in relation to the dataset used to train (or last used to update) the plurality of models associated with the dataset. The system can determine that the current data has drifted in relation to the dataset used to train (or last used to update) the plurality of models associated with the dataset based at least in part on an extent of a difference between the current data and the dataset used to train the plurality of models. For example, if an extent of a difference between the current data and the dataset used to train the plurality of models is equal to, or exceeds, a predetermined minimum drift threshold.

According to various embodiments, the system determines to update the set of one or more models in response to receiving the updated dataset (or updated information for the dataset). For example, in response to receiving the updated dataset, the system determines an accuracy of one or more models (e.g., a prediction accuracy) corresponding to the dataset has changed when such one or more models are invoked with respect to the current data (e.g., the updated data and/or the updated information for the dataset). The system can determine that the accuracy of a model has changed based at least in part on an extent of a difference between the accuracy of the model with respect to the current data and the accuracy of the model with respect to the dataset used to train the plurality of models. For example, if an extent of a difference is equal to, or exceeds, a predetermined accuracy change threshold, the system deems the accuracy of the model to have changed (e.g., if the accuracy of the model using the current data is worse than the accuracy of the model using the dataset by at least a threshold amount). In some embodiments, the system determines that a model is to be updated in response to determining that the accuracy of the model using the current data is less than a predetermined minimum accuracy threshold (e.g., a model having an accuracy below some predetermined minimum accuracy threshold is deemed to be stale and to be updated).

According to various embodiments, the system automatically tunes (e.g., updates) a set of models (e.g., a set of models corresponding to a particulate dataset). As an example, the system may automatically tune the set of models according to a predetermined schedule or according to a predetermined interval. Examples of the predetermined interval include daily, weekly, monthly, etc. In some embodiments, the tuning of a set of models is similar to the building of the set of models.

At 920, a plurality of optimizer modules to optimize the model(s) is determined. In response to determining that one or more models are to be updated, the system determines a plurality of optimizer modules (or simply optimizers) to be allocated to the updating of the model(s).

In some embodiments, the system determines a set of optimizers (e.g., threads, compute nodes, processor cores, etc.) to allocate to the updating (e.g., training) of the model(s). As an example, the system determines a set of optimizers available for building models. In response to determining the set of optimizers available for building models, the system uses at least a subset of optimizers available to build the model(s). As an example, the system allocates as many resources as possible or as needed from among the set of optimizers available to build subsets of the model(s) in parallel with each other. The set of optimizers available for building models may be defined by one or more boundary conditions, including any one or more of a predetermined number of compute resources for building models, a predetermined percentage of system compute resources, a remaining set of compute resources after taking into account allocations of resources for other system processes, etc.

At 930, the plurality of optimizer modules are caused to update model(s). According to various embodiments, in response to determining the optimizers to allocate to update the plurality of models, the system assigns a respective one of the plurality of models to each optimizer, and the optimizers correspondingly update (e.g., trains) the respective models. In some embodiments, the optimizers working in parallel respectively update different models at a particular time. As an example, the different models across the set of optimizers working in parallel have no dependence because the models and corresponding datasets are isolated.

The updating of a model by an optimizer includes caching the corresponding dataset for which a model is to be built, obtaining a set of starting parameters, and training the model based at least in part on information comprised in the dataset (e.g., information pertaining to the dimension along which the model is being built) and/or the set of starting parameters. In some embodiments, the caching of the corresponding dataset and the set of starting parameters comprises obtaining information from fields (e.g., rows) of the dataset, storing the information in a table, and storing parameters for tuning or parameterizing the meta-grouped models (e.g., the set of one or more models to be built for a dataset). The optimizer caches the model and optimizes the model based at least in part on running an iteration over various sets of parameters and selecting a best version of the set of model versions obtained by the corresponding iterations. In some embodiments, an optimizer training a particular model iterates over a set of combinations or permutations of parameters. The optimizer may implement a threshold maximum number of parameters and iterate over a set of combinations or permutations of different parameters constrained by threshold maximum number of parameters.

At 940, the model(s) is/are deployed. In some embodiments, in response to updating the model(s), the system exposes the models to a selection interface. As an example, if only a subset of the models for a dataset are updated, then the system updates the models exposed to include the updated models (e.g., to replace the models for which updated models were trained). In some embodiments, in response to updating the model(s), the system updates the composite model corresponding to the dataset (e.g., a new composite model is created or the existing composite model is updated to include, or point to, the updated model(s)), etc.). In some embodiments, deploying the models includes invoking 740 of process 700 of FIG. 7.

At 950, a determination is made as to whether process 900 is complete. In some embodiments, process 900 is determined to be complete in response to a determination that no further models are to be optimized, a user has indicated that no further models are to be optimized, an administrator indicates that process 900 is to be paused or stopped, etc. In response to a determination that process 900 is complete, process 900 ends. In response to a determination that process 900 is not complete, process 900 returns to 910.

Figure 10:
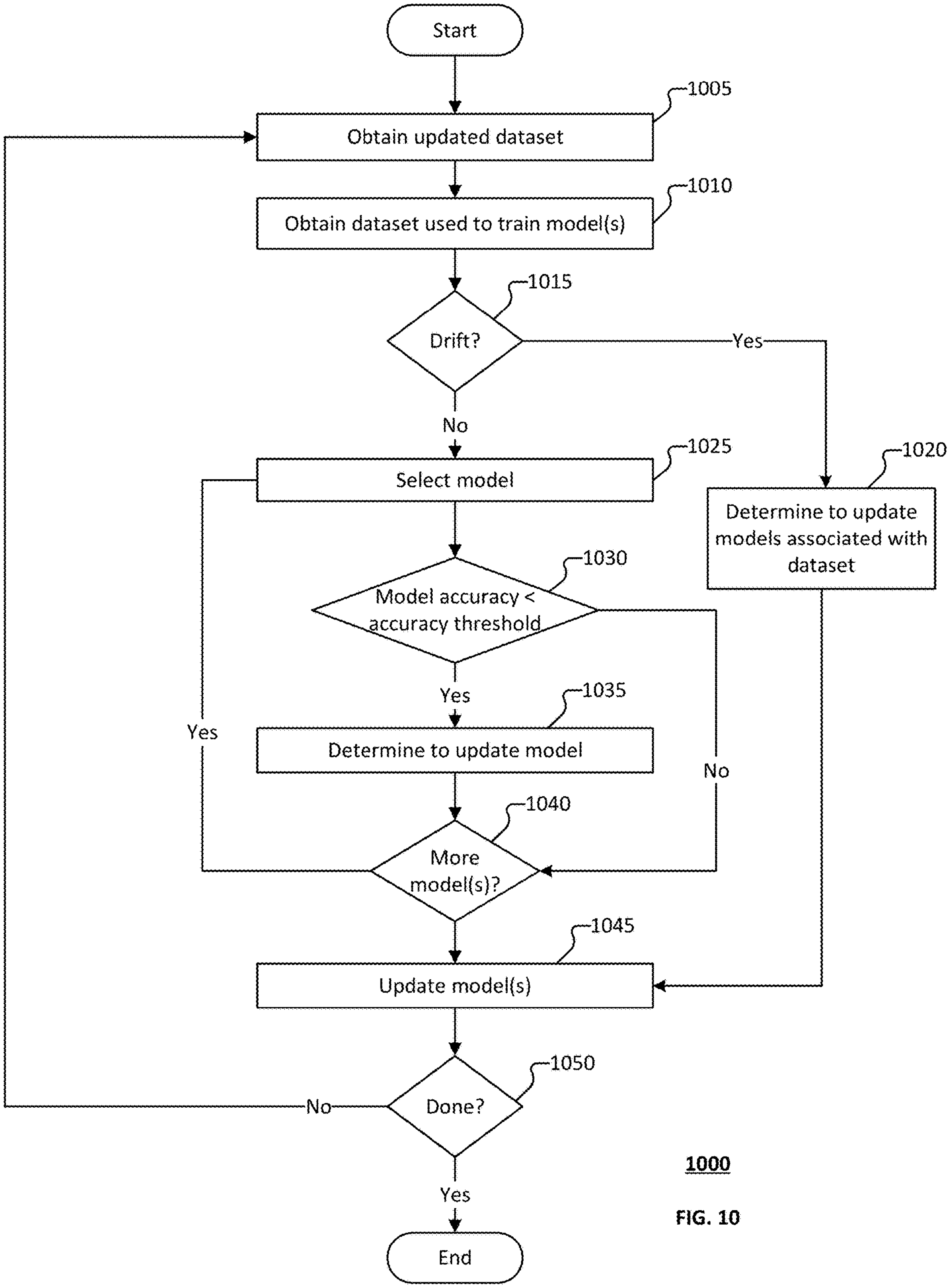
FIG. 10 is a flow diagram of a method for automatically tuning a set of models according to various embodiments of the present application.

FIG. 10 is a flow diagram of a method for automatically tuning a set of models according to various embodiments of the present application. In some embodiments, process 1000 is implemented at least in part by system 100 of FIG. 1 (e.g., model management service 110), and/or system 200 of FIG. 2. In some embodiments, process 1000 is implemented in connection with process 700 of FIG. 7, process 800 of FIG. 8, and/or process 900 of FIG. 9.

At 1005 an updated dataset is obtained. In some embodiments, the system receives an updated dataset via the input interface such as in a manner similar to obtaining the dataset at 710 or 720 of process 700 of FIG. 7. In some embodiments, the system receives periodic or continuous updated data for the dataset, such as from another system (e.g., a user system), and the system updates the dataset in storage (or creates an updated dataset).

At 1010, a dataset used to train a set of associated models is obtained. In some embodiments, the system determines the dataset used to train the associated models (e.g., the models that are currently deployed).

At 1015, a determination is performed as to whether a drift has occurred with respect to the dataset associated with the models. In some embodiments, the system determines that the current data has drifted in relation to the dataset used to train (or last used to update) the plurality of models associated with the dataset based at least in part on an extent of a difference between the current data and the dataset used to train the plurality of models. For example, if an extent of a difference between the current data and the dataset used to train the plurality of models is equal to, or exceeds, a predetermined minimum drift threshold.

In response to determining that drift has occurred with respect to the dataset at 1015, process 1000 proceeds to 1020 at which a determination is made to update the models (e.g., all the models) associated with the dataset.

In response to determining that drift has not occurred with respect to the dataset at 1015, process 1000 proceeds to 1025 at which a model is selected from among the models associated with the dataset.

At 1030, a determination is made as to whether the accuracy of the selected model is less than an accuracy threshold. In some embodiments, the system determines that a model is to be updated in response to determining that the accuracy of the model using the current data is less than a predetermined minimum accuracy threshold (e.g., a model having an accuracy below some predetermined minimum accuracy threshold is deemed to be stale and to be updated).

In response to a determination that the accuracy of the selected model is less than the accuracy threshold at 1030, process 1000 proceeds to 1035 at which the selected model is determined to be updated. Thereafter, process 1000 proceeds to 1040.

In response to a determination that the accuracy of the selected model is not less than the accuracy threshold at 1030, process 1000 proceeds to 1040 at which a determination is made as to whether additional models exist for which a determination at 1030 is to be performed. In some embodiments, process 1000 iterates through 1025 to 1040 until the accuracy for all models associated with the dataset have been assessed.

At 1045, the models indicated to be updated are updated. For example, the system updates those models for which process 1000 stores an indication that such models are to be updated at 1020 or 1045. In some embodiments, the updating the models corresponds to, or is similar to, process 900 of FIG. 9.

At 1050, a determination is made as to whether process 1000 is complete. In some embodiments, process 1000 is determined to be complete in response to a determination that no further datasets are updated, an administrator indicates that process 1000 is to be paused or stopped, etc. In response to a determination that process 1000 is complete, process 1000 ends. In response to a determination that process 1000 is not complete, process 1000 returns to 1005.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits, programmable logic devices, and ROM and RAM devices. Examples of program code include both machine code, as produced, for example, by a compiler, or files containing higher level code, for example, a script that can be executed using an interpreter.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A computer-implemented method, comprising:

accessing a set of machine-learning models trained using a dataset, wherein the dataset comprises at least a set of keys and key-values for the set of keys, and wherein each machine-learning model is trained using a respective subset of the dataset corresponding to a respective set of key-values for the set of keys;

receiving, via an interface, a current dataset that is an updated dataset;

determining whether drift has occurred with respect to the dataset used to train the set of machine-learning models, comprising determining whether a difference between the current dataset and the dataset exceeds a drift threshold;

responsive to a determination the drift has occurred and the difference exceeds the drift threshold, identifying one or more machine-learning models in the set of machine-learning models that were trained using a drifted portion of the dataset;

tuning parameters of the one or more machine-learning models in the set of machine-learning models using the current dataset to generate another set of machine-learning models;

for a selected machine-learning model that is not determined to have drift, obtaining an accuracy of the machine-learning model;

responsive to a determination that the accuracy is below an accuracy threshold, iteratively updating parameters of the selected machine-learning model by using a set of optimizers that are threads, compute nodes, or processor cores until the accuracy of the machine-learning model exceeds the accuracy threshold, wherein the set of optimizers retain a history of the iterative updates and stops when a maximum iterations are reached, stops when there is no improvement in the accuracy, or the accuracy decreases; and exposing the another set of machine-learning models via an interface of a computing service.

2. The computer-implemented method of claim 1, comprising:

receiving another current dataset;

for a selected machine-learning model, determining whether an accuracy of the selected machine-learning model with respect to the dataset or the current dataset has decreased below another threshold; and responsive to a determination that the accuracy of the selected machine-learning model has decreased below the another threshold, tuning parameters of the selected machine-learning model using the another current dataset.

3. The computer-implemented method of claim 1, comprising:

for each machine-learning model of the one or more machine-learning models, allocating the machine-learning model to a respective compute resource in a set of compute resources for tuning the parameters of the machine-learning model.

4. The computer-implemented method of claim 3, further comprising:

for each machine-learning model of the one or more machine-learning models, caching a corresponding dataset of the current dataset for tuning the parameters of the machine-learning model in the respective compute resource.

5. The computer-implemented method of claim 1, wherein the another set of machine-learning models is exposed as a composite model via the interface, and wherein the interface is an application programming interface (API) or a web interface.

6. The computer-implemented method of claim 1, further comprising:

receiving, from a client device, a query via the interface exposing the another set of machine-learned models;

selecting at least one of the another set of machine-learning models for servicing the query;

generating a prediction for the query using the at least one machine-learning model; and providing the prediction to the client device as a response to the query.

7. The computer-implemented method of claim 1, wherein the set of keys represent one or a combination of geographical region, item, price, date, and time information.

8. A non-transitory computer-readable storage medium comprising stored instructions executable by a processor system, the instructions when executed causing the processor system to:

access a set of machine-learning models trained using a dataset, wherein the dataset comprises at least a set of keys and key-values for the set of keys, and wherein each machine-learning model is trained using a respective subset of the dataset corresponding to a respective set of key-values for the set of keys;

receive, via an interface, a current dataset that is an updated dataset;

determine whether drift has occurred with respect to the dataset used to train the set of machine-learning models, comprising determining whether a difference between the current dataset and the dataset exceeds a drift threshold;

responsive to a determination the drift has occurred and the difference exceeds the drift threshold, identify one or more machine-learning models in the set of machine-learning models that were trained using a drifted portion of the dataset;

tune parameters of the one or more machine-learning models in the set of machine-learning models using the current dataset to generate another set of machine-learning models;

for a selected machine-learning model that is not determined to have drift, obtain an accuracy of the machine-learning model;

responsive to a determination that the accuracy is below an accuracy threshold, iteratively update parameters of the selected machine-learning model by using a set of optimizers that are threads, compute nodes, or processor cores until the accuracy of the machine-learning model exceeds the accuracy threshold, wherein the set of optimizers retain a history of the iterative updates and stops when a maximum iterations are reached, stops when there is no improvement in the accuracy, or the accuracy decreases; and expose the another set of machine-learning models via an interface of a computing service.

9. The non-transitory computer-readable storage medium of claim 8, wherein the instructions when executed further cause the processor system to:

receive another current dataset;

for a selected machine-learning model, determine whether an accuracy of the selected machine-learning model with respect to the dataset or the current dataset has decreased below another threshold; and responsive to a determination that the accuracy of the selected machine-learning model has decreased below the another threshold, tune parameters of the selected machine-learning model using the another current dataset.

10. The non-transitory computer-readable storage medium of claim 8, wherein the instructions when executed further cause the processor system to:

for each machine-learning model of the one or more machine-learning models, allocate the machine-learning model to a respective compute resource in a set of compute resources for tuning the parameters of the machine-learning model.

11. The non-transitory computer-readable storage medium of claim 10, wherein the instructions when executed further cause the processor system to:

for each machine-learning model of the one or more machine-learning models, cache a corresponding dataset of the current dataset for tuning the parameters of the machine-learning model in the respective compute resource.

12. The non-transitory computer-readable storage medium of claim 8, wherein the another set of machine-learning models is exposed as a composite model via the interface, and wherein the interface is an application programming interface (API) or a web interface.

13. The non-transitory computer-readable storage medium of claim 8, wherein the instructions when executed further cause the processor system to:

receive, from a client device, a query via the interface exposing the another set of machine-learned models;

select at least one of the another set of machine-learning models for servicing the query;

generate a prediction for the query using the at least one machine-learning model; and provide the prediction to the client device as a response to the query.

14. The non-transitory computer-readable storage medium of claim 8, wherein the set of keys represent one or a combination of geographical region, item, price, date, and time information.

15. A computer system, comprising:

a processor system; and a non-transitory computer-readable storage medium comprising stored instructions executable by a processor system, the instructions when executed causing the processor system to:

access a set of machine-learning models trained using a dataset, wherein the dataset comprises at least a set of keys and key-values for the set of keys, and wherein each machine-learning model is trained using a respective subset of the dataset corresponding to a respective set of key-values for the set of keys;

receive, via an interface, a current dataset that is an updated dataset;

determine whether drift has occurred with respect to the dataset used to train the set of machine-learning models, comprising determining whether a difference between the current dataset and the dataset exceeds a drift threshold;

responsive to a determination the drift has occurred and the difference exceeds the drift threshold, identify one or more machine-learning models in the set of machined-learning models that were trained using a drifted portion of the dataset;

tune parameters of the one or more machine-learning models in the set of machine-learning models using the current dataset to generate another set of machine-learning models;

for a selected machine-learning model that is not determined to have drift, obtain an accuracy of the machine-learning model;

responsive to a determination the accuracy is below an accuracy threshold, iteratively update parameters of the selected machine-learning model by using a set of optimizers that are threads, compute nodes, or processor cores until the accuracy of the machine-learning model exceeds the accuracy threshold, wherein the set of optimizers retain a history of the iterative updates and stops when a maximum iterations are reached, stops when there is no improvement in the accuracy, or the accuracy decreases; and expose the another set of machine-learning models via an interface of a computing service.

16. The computer system of claim 15, wherein the instructions when executed further cause the processor system to:

receive another current dataset;

for a selected machine-learning model, determine whether an accuracy of the selected machine-learning model with respect to the dataset or the current dataset has decreased below another threshold; and responsive to a determination that the accuracy of the selected machine-learning model has decreased below the another threshold, tune parameters of the selected machine-learning model using the another current dataset.

17. The computer system of claim 15, wherein the instructions when executed further cause the processor system to:

for each machine-learning model of the one or more machine-learning models, allocate the machine-learning model to a respective compute resource in a set of compute resources for tuning the parameters of the machine-learning model.

18. The computer system of claim 17, wherein the instructions when executed further cause the processor system to:

for each machine-learning model of the one or more machine-learning models, cache a corresponding dataset of the current dataset for tuning the parameters of the machine-learning model in the respective compute resource.

19. The computer system of claim 15, wherein the another set of machine-learning models is exposed as a composite model via the interface, and wherein the interface is an application programming interface (API) or a web interface.

20. The computer system of claim 15, wherein the instructions when executed further cause the processor system to:

receive, from a client device, a query via the interface exposing the another set of machine-learned models;

select at least one of the another set of machine-learning models for servicing the query;

generate a prediction for the query using the at least one machine-learning model; and provide the prediction to the client device as a response to the query.

* * * * *